United States Patent
Shigemi et al.

(10) Patent No.: US 7,599,824 B2
(45) Date of Patent: Oct. 6, 2009

(54) GEAR CUTTING SIMULATION METHOD, GEAR CUTTING SIMULATION PROGRAM, AND GEAR CUTTING SIMULATION DEVICE

(75) Inventors: Takao Shigemi, Kurashiki (JP); Akira Yamamoto, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 701 days.

(21) Appl. No.: 11/079,388

(22) Filed: Mar. 15, 2005

(65) Prior Publication Data
US 2005/0159938 A1    Jul. 21, 2005

(51) Int. Cl.
G06G 7/48    (2006.01)
G06G 7/64    (2006.01)

(52) U.S. Cl. .................. 703/7; 703/1; 700/98
(58) Field of Classification Search ............. 409/26, 409/51, 8, 10, 12, 49, 50, 61; 74/457, 640; 73/162; 700/83, 186, 170, 173, 191, 192, 700/193, 194, 98, 97; 702/113; 451/5, 47, 451/57, 4; 33/501.7, 501.15, 501.16; 703/7, 703/6, 1

See application file for complete search history.

(56) References Cited

U.S. PATENT DOCUMENTS

| | | | | |
|---|---|---|---|---|
| 4,954,027 A | * | 9/1990 | Faulstich | 409/26 |
| 5,191,739 A | * | 3/1993 | Kondo et al. | 451/47 |
| 5,511,414 A | * | 4/1996 | Nakamura et al. | 700/182 |
| 6,050,883 A | * | 4/2000 | Wiener | 451/47 |
| 6,823,235 B2 | * | 11/2004 | Toyozawa et al. | 700/193 |
| 6,907,313 B2 | * | 6/2005 | Matthews et al. | 700/182 |
| 7,296,956 B2 | * | 11/2007 | Dirnfeldner | 409/235 |
| 2005/0065746 A1 | * | 3/2005 | Dohle et al. | 702/113 |
| 2005/0192684 A1 | * | 9/2005 | Friedrich et al. | 700/83 |
| 2005/0274216 A1 | * | 12/2005 | Fleytman | 74/457 |
| 2006/0005653 A1 | * | 1/2006 | Fleytman | 74/425 |

FOREIGN PATENT DOCUMENTS

| | | |
|---|---|---|
| JP | 02-236704 | 9/1990 |
| JP | 03-178720 | 8/1991 |
| JP | 6-109593 | 4/1994 |
| JP | 07-219612 | 8/1995 |
| JP | 9-212222 | 8/1997 |
| JP | 2004-086773 A * | 3/2004 |

OTHER PUBLICATIONS

Machine Translation of JP-2004-086773-A (JP 2004-086773 was published Mar. 18, 2004).*
English abstract from the Japanese Patent Office Database of JP 09-212222-A (JP 09-212222 A was published Aug. 15, 1997).*

* cited by examiner

Primary Examiner—Erica E Cadugan
(74) Attorney, Agent, or Firm—Squire, Sanders & Dempsey L.L.P.

(57) ABSTRACT

In a gear cutting simulation method and device, a gear-cutting-machine model which specifies relative positions between a blank model and a cutter model is created. A gear model is created as a result of simulation of gear cutting which is performed with the blank model and the cutter model arranged in the gear-cutting-machine model.

8 Claims, 30 Drawing Sheets

FIG.5B

| PARAMETER | REMARKS |
|---|---|
| A | LENGTH OF EFFECTIVE TOOTH TRACE |
| B | LENGTH OF TOOTH CONTACT IN TOOTH TRACE DIRECTION |
| C | LENGTH FROM CENTER OF EFFECTIVE TOOTH FLANK TO CENTER OF TOOTH CONTACT IN TOOTH TRACE DIRECTION |
| D | WORKING DEPTH |
| E | LENGTH OF TOOTH CONTACT IN TOOTH DEPTH DIRECTION |
| F | LENGTH FROM CENTER OF EFFECTIVE TOOTH FLANK TO CENTER OF TOOTH CONTACT IN TOOTH DEPTH DIRECTION |
| G | POSITION OF CENTER OF TOOTH CONTACT (POINT OF INSTANTANEOUS CONTACT) |
| H | AREA OF INSTANTANEOUS TOOTH CONTACT |
| I | TOTAL AREA OF TOOTH CONTACT |
| J | BIAS ANGLE |
| K | CENTER OF EFFECTIVE TOOTH FLANK |

FIG.6

| PARAMETER | CRITERIA | TOLERANCE |
|---|---|---|
| RATIO OF TOOTH CONTACT AREA TO TOOTH-FLANK AREA | 25% | 20—30% |
| RATIO OF TOOTH-CONTACT LENGTH IN TOOTH TRACE DIRECTION TO EFFECTIVE-TOOTH-TRACE LENGTH | 50% | 40—60% |
| RATIO OF TOOTH-CONTACT LENGTH IN TOOTH DEPTH DIRECTION TO WORKING DEPTH | 60% | 50—70% |
| DEVIATION OF CENTER OF TOOTH CONTACT IN TOOTH TRACE DIRECTION | 20% | 15—25% |
| DEVIATION OF CENTER OF TOOTH CONTACT IN TOOTH DEPTH DIRECTION | 10% | 5—15% |
| ADJACENT TRANSMISSION CURVES INTERSECT AT ONE POINT ONLY | Yes/No | ——— |
| BIAS ANGLE | 30 | ±10% |

| PARAMETER | VALUE |
|---|---|
| PINION NUMBER OF TEETH | 3 |
| GEAR NUMBER OF TEETH | 45 |
| GEAR FACE WIDTH | *** |
| PINION OFFSET | *** |
| GEAR PITCH DIAMETER | *** |
| CUTTER DIAMETER | *** |
| AVERAGE PRESSURE ANGLE | *** |
| DEPTH FACTOR | *** |
| GEAR ADDENDUM FACTOR | *** |
| BACKLASH (Bmin) | *** |
| BACKLASH (Bmax) | *** |
| SUMMARY NUMBER | *** |

| PARAMETER | VALUE | |
|---|---|---|
| | PINION | GEAR |
| NUMBER OF TEETH | 3 | 45 |
| OUTER MODULE | | *** |
| PINION OFFSET | *** | |
| FACE WIDTH | | *** |
| AVERAGE PRESSURE ANGLE | *** | |
| CUTTER DIAMETER | *** | |
| PITCH DIAMETER | *** | *** |
| ADDENDUM | *** | *** |
| DEDENDUM | *** | *** |
| WHOLE DEPTH | *** | |
| OUTSIDE DIAMETER | *** | *** |
| PITCH APEX BEYOND C.P. | *** | *** |
| FACE APEX BEYOND C.P. | *** | *** |
| ROOT APEN BEYOND C.P. | *** | *** |
| CROWN TO C.P. | *** | *** |
| FRONT CROWN TO C.P. | *** | *** |
| PITCH ANGLE | *** | *** |
| FACE ANGLE | *** | *** |
| ROOT ANGLE | *** | *** |
| SPIRAL ANGLE | *** | *** |

FIG.10

| PARAMETER | VALUE | |
|---|---|---|
| | PINION | GEAR |
| MEAN NORMAL MODULE | *** | |
| MEAN PITCH RADIUS | *** | *** |
| MEAN CONE DISTANCE | *** | *** |
| MEAN ADDENDUM | *** | *** |
| MEAN DEDENDUM | *** | *** |
| CLEARANCE | *** | |
| MEAN WHOLE DEPTH | *** | |
| MEANS TOOTH THICKNESS | *** | *** |
| MEAN TOOTH TOP LAND | *** | *** |
| DEDENDUM ANGLE | *** | *** |
| LIMIT PRESSURE ANGLE | *** | |

| PARAMETER | VALUE | |
|---|---|---|
| | PINION | GEAR |
| CUTTER DIAMETER | 2.0000 | |
| OUTSIDE BLADE ANGLE | *** | *** |
| INSIDE BLADE ANGLE | *** | *** |
| POINT WIDTH | *** | *** |

FIG.12

| PARAMETER | VALUE | |
|---|---|---|
| | PINION | GEAR |
| MACHINE ROOT ANGLE | 359.000 | 74.646 |
| MACHINE CENTER TO BACK | ***+ MD | ***+ MD |
| SLINDING BASE | *** | |
| BLANK OFFSET | *** | |
| ECCENTRIC ANGLE | *** | *** |
| CRADLE ANGLE | *** | *** |
| SWIVEL ANGLE | *** | |
| SPINDLE ROTATION ANGLE | *** | |
| CRADLE TEST ROLL | *** | |
| WORK TEST ROLL | *** | |
| DECIMAL RATIO | *** | |

FIG.13

| PARAMETER | VALUE | |
| --- | --- | --- |
| | PINION | GEAR |
| NUMBER OF TEETH | 3 | 45 |
| FACE WIDTH | | *** |
| PINION OFFSET | *** | |
| PITCH DIAMETER | *** | *** |
| PINION CONE DISTANCE | *** | |
| SPIRAL ANGLE | *** | *** |
| PITCH ANGLE | *** | *** |
| AVERAGE PRESSURE ANGLE | *** | |
| MEAN PITCH RADIUS | *** | *** |
| PINION CROWN TO C.P. | *** | |
| PINION FRONT CROWN TO C.P. | *** | |
| CUTTER EDGE RADIUS | *** | *** |
| GEAR POINT WIDTH | *** | *** |
| DEPTH FACTOR | *** | |
| GEAR ADDENDUM FACTOR | *** | |
| SUMMARY NUMBER | *** | |

FIG.14

| PARAMETER | VALUE | |
|---|---|---|
| | PINION | GEAR |
| NUMBER OF TEETH | 3 | 45 |
| OUTER MODULE | *** | |
| MEAN NORMAL MODULE | | *** |
| MEANS PITCH RADIUS | *** | *** |
| MEANS CONE DISTANCE | *** | *** |
| MEAN WHOLE DEPTH | *** | *** |
| MEAN TOOTH THICKNESS | *** | *** |
| MEAN TOOTH TOP LAND | *** | *** |
| PITCH DIAMETER | *** | *** |
| RELATIVE CURVATURE | *** | |
| LOAD SHARING RATIO | *** | |
| LENGTH OF CONTACT | *** | |
| GEOMETRY FACTOR-I | *** | |
| CUTTER EDGE RADIUS | *** | *** |
| GEOMETRY FACTOR-J | *** | *** |
| CONTACT RATIO MP | *** | |
| CONTACT RATIO MF | *** | |
| CONTACT RATIO MO | *** | |

FIG.15

| PARAMETER | VALUE |
|---|---|
| INPUT POWER | 0.1 |
| INPUT ROTATION SPEED | 1500 |

FIG.16

| PARAMETER | VALUE | |
| | PINION | GEAR |
|---|---|---|
| CONTACT STRESS | *** | |
| BENDING STRESS | *** | *** |
| SLIDING VELOCITY | *** | |
| ALLOWABLE TRANSMITTED POWER | *** | |
| EFFICIENCY | *** | |

FIG.27

| DETERMINATION ITEMS | THRESHOLD | |
|---|---|---|
| | MIN. | MAX. |
| RATIO OF TOOTH CONTACT AREA TO TOOTH-FLANK AREA | 2.5% | — |
| RATIO OF TOOTH-CONTACT LENGTH IN TOOTH TRACE DIRECTION TO EFFECTIVE-TOOTH-TRACE LENGTH | 5% | — |
| RATIO OF TOOTH-CONTACT LENGTH IN TOOTH DEPTH DIRECTION TO WORKING DEPTH | 6% | — |
| DEVIATION OF CENTER OF TOOTH CONTACT IN TOOTH TRACE DIRECTION | — | 45% |
| DEVIATION OF CENTER OF TOOTH CONTACT IN TOOTH DEPTH DIRECTION | — | 45% |
| ADJACENT TRANSMISSION CURVES INTERSECT AT ONE POINT ONLY | — | — |
| BIAS ANGLE | — | — |

FIG.30

| | EVALUATION ITEMS | | TOOTH CONTACT / EVALUATION VALUE / CHANGE VALUE | | | |
|---|---|---|---|---|---|---|
| | | | STATE-1 | STATE-2 | STATE-3 | STATE-4 |
| TOOTH CONTACT | | | 500 ⟶ (oval) | (oval) | (circle) | (oval) |
| EVALUATION VALUE OF TOOTH-CONTACT STATE | A | TOOTH-CONTACT AREA | 1 | >1.5 | >2 | 1 |
| | B | T.C. LENGTH IN FLANK DIR. | 1 | 1 | 1 | 1.5 |
| | C | T.C. LENGTH IN DEPTH DIR. | 1 | 1 | 1 | 1 |
| | D | DEVIATION OF T.C. CENTER IN FLANK DIR. | 1 | 1 | 1 | 1 |
| | E | DEVIATION OF T.C. CENTER IN DEPTH DIR. | 1 | 1 | 1 | 1 |
| | F | INTERSECTING OF ADJ. TRANS. CURVES | 1 | 1 | 1 | 1 |
| | G | BIAS ANGLE | 1 | 1 | 1 | 1 |
| ADJUSTMENT VALUE OF CUTTING CONDITION | ADJUSTED CUTTER DIA. | CUTTER DIA. | ---- | ---- | ---- | *** |
| | ADJUSTED M.S. | MACHINE ROOT ANGLE | 0 | ***+MD | ***+MD | |
| | | MACHINE CENTER TO BACK | 0 | *** | *** | |
| | | SLIDING BASE | 0 | *** | *** | |
| | | BLANK OFFSET | 0 | *** | *** | |
| | | ECCENTRIC ANGLE | 0 | *** | *** | |
| | | CRADLE ANGLE | 0 | *** | *** | |
| | | SWIVEL ANGLE | 0 | *** | *** | |
| | | SPINDLE ROTATION ANGLE | 0 | *** | *** | |
| | | CRADLE ROTATION ROLL | 0 | *** | *** | |
| | | WORK TEST ROLL | 0 | *** | *** | |
| | | DECIMAL RATIO | 0 | *** | *** | |

GEAR CUTTING SIMULATION METHOD, GEAR CUTTING SIMULATION PROGRAM, AND GEAR CUTTING SIMULATION DEVICE

CROSS-REFERENCE TO RELATED APPLICATION

This application is based upon Japanese Patent Application No. 2002-249678, which was filed on Aug. 28, 2002 and laid open as Japanese Laid-Open Patent Application No. 2004-086773 on Mar. 18, 2004, the entire contents of which are incorporated herein by reference.

BACKGROUND OF THE INVENTION

1. Field of the Invention

The present invention generally relates to computer-based simulation method and device, and more particularly to computer-based gear cutting simulation method and device.

2. Description of the Related Art

Conventionally, there have been many approaches for analyzing the gear cutting state and engagement condition, in order to reduce the load of the actual gear cutting work or the design operation.

For example, Japanese Laid-Open Patent Application No. 9-212222 discloses the method of checking the interference of the tool and the gear and the interference of the gears in the engagement relation by carrying out the simulation of the gear cutting state based on the basic gear specifications in the design. Japanese Laid-Open Patent Application No. 6-109593 discloses the method of determining the gear engagement condition by carrying out the simulation based on the condition values of the gears in the design.

According to the above-mentioned methods, the gear cutting state and engagement condition can be analyzed on the 3-dimensional (3D) virtual space using the computer.

Moreover, it is known that it is difficult to carry out the simulation in the case of hypoid gears because of the particulars of the tooth form. The system of Gleason Co. has been widely used as a means for determining the gear engagement condition by carrying out the simulation based on the gear design value similar to the above-mentioned methods.

However, when the satisfactory analysis result is not obtained by using the above-mentioned methods, there is the problem in that it is uncertain how the gear cutting conditions, the gear geometry value, etc. should be changed in order to create the gear that can withstand the actual use.

Although the system of Gleason Co. provides the guideline for changing such parameters, it is difficult to obtain the proper tooth-contact state by actually changing the parameters according to the guideline. As a result, how the parameters should be changed significantly depends on the experience or workmanship of the operator in the field.

SUMMARY OF THE INVENTION

An object of the present invention is to provide an improved gear cutting simulation method and device in which the above-mentioned problems are eliminated.

Another object of the present invention is to provide a gear cutting simulation method, a computer program product and a gear cutting simulation device which are capable of carrying out the gear cutting simulation using the 3D gear model having the configuration equivalent to that of the actually produced gear.

In order to achieve the above-mentioned objects, the present invention provides a gear cutting simulation method having the steps of: creating a gear-cutting-machine model which specifies relative positions between a blank model and a cutter model; and creating a gear model as a result of simulation of gear cutting performed with the blank model and the cutter model arranged in the gear-cutting-machine model.

In order to achieve the above-mentioned objects, the present invention provides a computer program product embodied therein for causing a computer to execute a gear cutting simulation method, the method having the steps of: creating a gear-cutting-machine model which specifies relative positions between a blank model and a cutter model; and creating a gear model as a result of simulation of gear cutting performed with the blank model and the cutter model arranged in the gear-cutting-machine model.

In order to achieve the above-mentioned objects, the present invention provides a gear cutting simulation device which causes a computer to execute a gear cutting simulation method, the gear cutting simulation device having: a machine setting calculation unit creating a gear-cutting-machine model which specifies relative positions between a blank model and a cutter model; and a gear cutting simulation unit creating a gear model as a result of simulation of gear cutting performed with the blank model and the cutter model arranged in the gear-cutting-machine model.

According to the gear cutting simulation method of the present invention, the simulation of gear cutting which is the procedure equivalent to the machining of the actual gear making is carried out with the blank model and the cutter model arranged in the gear-cutting-machine model, and the 3D gear model having the configuration equivalent to that of the actual gear can be obtained.

Moreover, the gear cutting simulation method of the present invention may be configured so that the step of creating the gear model comprises performing a Boolean logic operation of the blank model and the cutter model.

According to such gear cutting simulation method, the gear model is created by performing the Boolean logic operation of the blank model and the cutter model, and the 3D gear model having the configuration equivalent to that of the actual gear can be created by removing the portion of the blank model overlapping the cutter model by the cutter.

Moreover, the gear cutting simulation method of the present invention may be configured so that the method further comprises the step of outputting data indicating a tooth-contact state as a result of tooth-contact simulation performed by changing the relative positions between the blank model and the cutter model which are arranged in an assembled state.

According to such gear cutting simulation method, the tooth-contact state for the pinion and the gear of the gear model which is created through the simulation which is the procedure equivalent to that of the actual gear cutting method is analyzed, and the tooth-contact state which is equivalent to the actual tooth-contact state can be acquired.

Moreover, the gear cutting simulation method of the present invention may be configured so that the method further comprises the step of comparing the outputted data indicating the tooth-contact state with a predetermined reference value, so that validity of the gear model is determined by a comparison result.

According to such gear cutting simulation method, the validity of the tooth-contact state acquired through the simulation can be determined, and it can be easily determined whether the proper tooth-contact state is acquired.

Moreover, the gear cutting simulation method of the present invention may be configured so that the method further comprises the step of adjusting, when a result of the determination negates the validity of the gear model, at least one of the cutter model and machine setting of the gear-cutting-machine model specifying the relative positions between the blank model and the cutter model, so that the gear model creating step is performed again based on the adjusted cutter model or the adjusted machine setting.

According to such gear cutting simulation method, the processing after the simulation of gear cutting is performed again by changing the gear cutting conditions automatically when the proper tooth-contact state is not acquired, and the gear cutting conditions from which the satisfactory tooth-contact state is finally acquired can be acquired easily.

Moreover, the gear cutting simulation method of the present invention may be configured so that the method further comprises the step of creating a gear heat-treatment model as a result of simulation of heat treatment of the gear model which is performed when a result of the determination affirms the validity of the gear model, so that the step of outputting the data indicating the tooth-contact state is performed by using the created gear heat-treatment model as the gear model.

According to such gear cutting simulation method, the analysis of the tooth-contact state is performed with the gear model after the simulation of heat treatment of the gear model is performed, and the tooth-contact state in which the influence on the gear geometry by the heat treatment is considered can be acquired.

Moreover, the gear cutting simulation method of the present invention may be configured so that the method further comprises the step of creating a gear surface-treatment model as a result of simulation of surface treatment of the gear model which is performed when a result of the determination affirms the validity of the gear model, so that the step of outputting the data indicating the tooth-contact state is performed by using the created gear surface-treatment model as the gear model.

According to such gear cutting simulation method, the analysis of the tooth-contact state is performed with the gear model after the simulation of surface treatment of the gear model is performed, and the tooth-contact state in which the influence on the gear geometry by the surface treatment is considered can be acquired.

Moreover, the present invention can also be embodied into a gear cutting simulation program for causing the computer to execute the gear cutting simulation method, a gear cutting simulation device for causing the computer to execute the gear cutting simulation method, or a computer-readable storage medium in which the gear cutting simulation program is recorded, for the purpose of solving the above-mentioned objects.

According to the present invention, the simulation of gear cutting which is the procedure equivalent to the machining of the actual gear making is carried out with the blank model and the cutter model arranged in the gear-cutting-machine model, and the 3D gear model having the configuration equivalent to that of the actual gear can be obtained.

BRIEF DESCRIPTION OF THE DRAWINGS

Other objects, features and advantages of the present invention will be apparent from the following detailed description when read in conjunction with the accompanying drawings.

FIG. 5A and FIG. 5B are diagrams for explaining the parameters which are used to determine the tooth-contact state.

FIG. 6 is a diagram for explaining examples of the parameters which are used to determine the tooth-contact state.

FIG. 9 is a diagram showing the outline geometry value of the blank configuration outputted by the outline geometry calculation.

FIG. 10 is a diagram showing the outline geometry value of the gear tooth configuration outputted by the outline geometry calculation.

FIG. 11 is a diagram for explaining the cutter specification.

FIG. 12 is a diagram for explaining the machine setting of the gear cutting machine.

FIG. 13 is a diagram showing the input parameters of the configuration-related calculation in preparation of the performance/strength calculation.

FIG. 14 is a diagram showing the output results of the configuration-related calculation in preparation of the performance/strength calculation.

FIG. 15 is a diagram showing the input parameters of the performance/strength calculation.

FIG. 16 is a diagram showing the output results of the performance/strength calculation.

FIG. 27 is a diagram for explaining the threshold for determining the not-good tooth contact.

FIG. 30 is a diagram showing the table for determination of the adjustment parameter.

DETAILED DESCRIPTION OF PREFERRED EMBODIMENTS

A description will now be provided of the preferred embodiments of the present invention with reference to the accompanying drawings.

In the following embodiments, the gear cutting simulation of hypoid gear set will be explained as an example.

Figure 1:
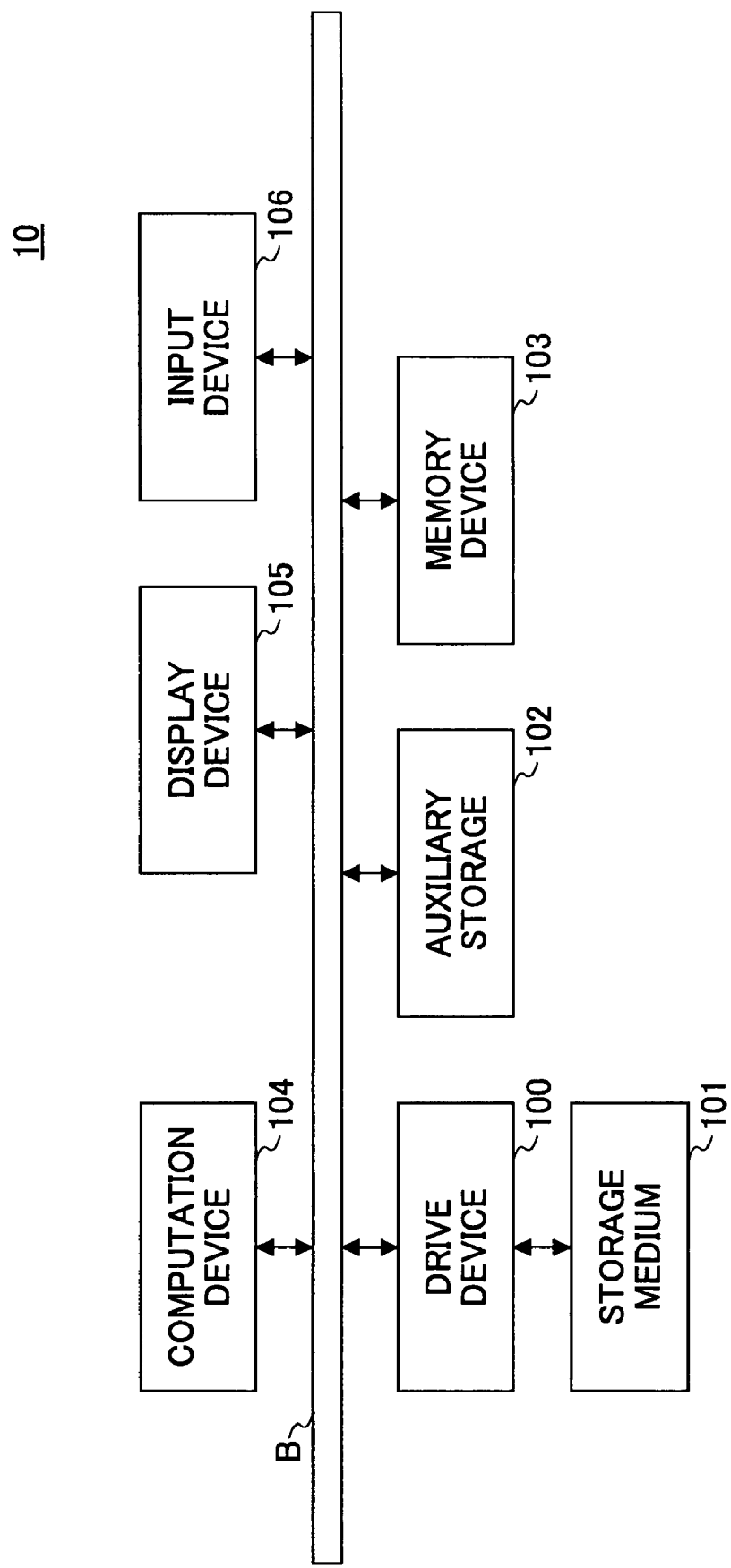
FIG. 1 is a block diagram showing the hardware composition of the gear cutting simulation device in the preferred embodiment of the invention.

FIG. 1 shows the hardware composition of the gear cutting simulation device 10 in the preferred embodiment of the invention.

The gear cutting simulation device 10 of FIG. 1 comprises the drive device 100, the storage medium 101, the auxiliary storage 102, the memory device 103, the computation device 104, the display device 105, and the input device 106, which are interconnected by the bus B.

The gear cutting simulation program which is used by the gear cutting simulation device 10 is supplied by the storage medium 101, such as CD-ROM. The storage medium 101 in which the gear cutting simulation program is recorded is set in the drive device 100, and the gear cutting simulation program is installed in the auxiliary storage 102 through the drive device 100 from the storage medium 101.

The auxiliary storage 102 stores the necessary files and data, etc. while storing the installed gear cutting simulation program. For example, the auxiliary storage 102 stores various tables required for the processing of the gear cutting simulation program which will be described later.

When a command to start the gear cutting simulation program is received or at the time of starting of the gear cutting simulation device 10, the gear cutting simulation program is read from the auxiliary storage 102 and stored into the memory device 103.

The computation device 104 performs the arithmetic functions related to the gear cutting simulation device 10 in accordance with the gear cutting simulation program stored in the memory device 103.

The display device 105 displays the situation of the simulation according to the gear cutting simulation program. The input device 106 may include the keyboard, the mouse, etc., and it is used to input various operational commands.

Figure 2:
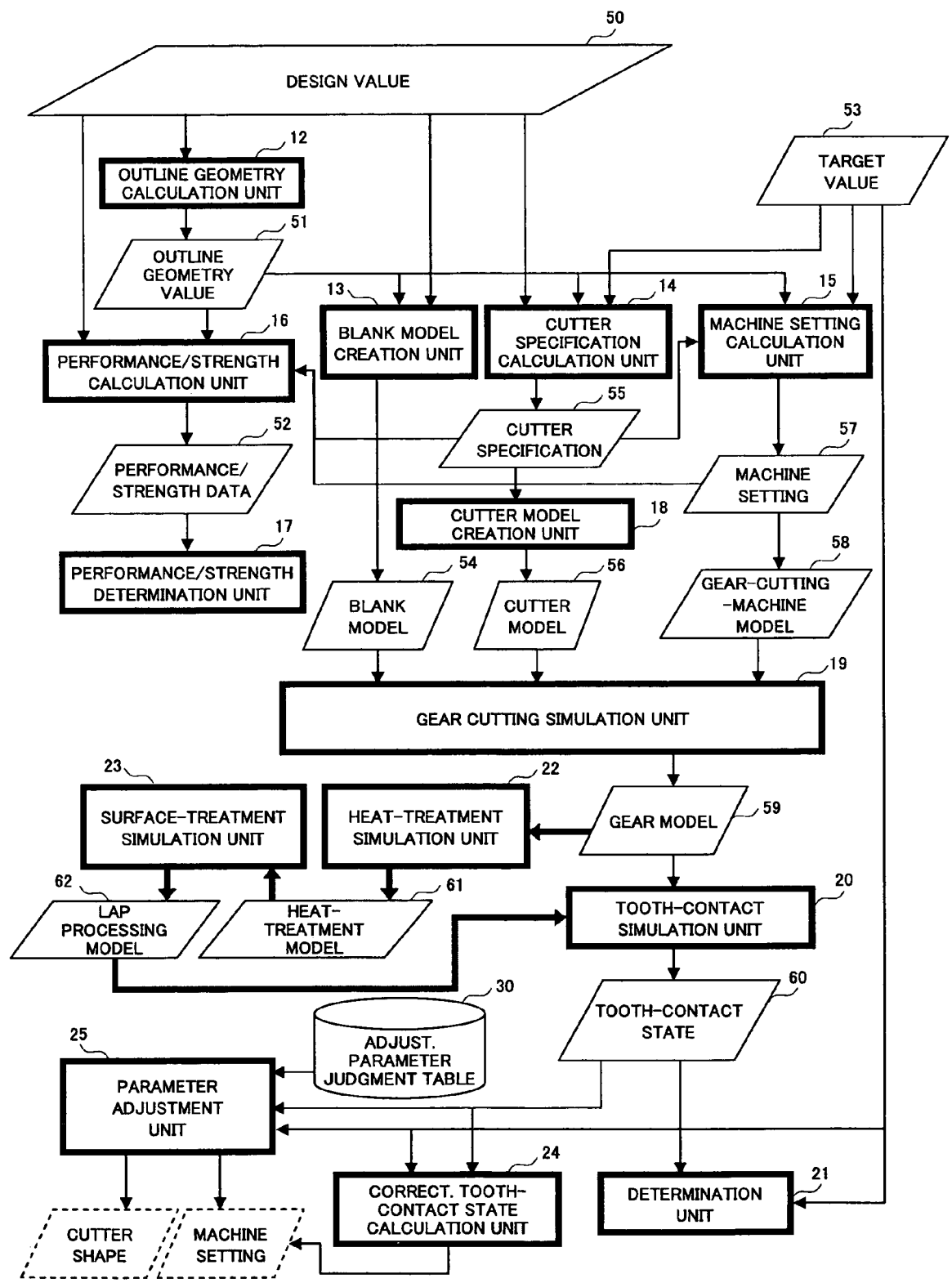
FIG. 2 is a block diagram showing the functional composition of the gear cutting simulation device in the present embodiment.

Next, the functional composition of the gear cutting simulation device 10 will be explained. FIG. 2 shows the functional composition of the gear cutting simulation device 10.

As shown in FIG. 2, the gear cutting simulation device 10 comprises the following elements: the outline geometry calculation unit 12, the blank model creation unit 13, the cutter specification calculation unit 14, the machine setting calculation unit 15, the performance/strength calculation unit 16, the performance/strength determination unit 17, the cutter model creation unit 18, the gear cutting simulation unit 19, the tooth-contact simulation unit 20, the determination unit 21, the heat-treatment simulation unit 22, the lapping simulation unit 23, the correction tooth-contact state calculation unit 24, the parameter adjustment unit 25, and the adjustment parameter judgment table 30.

Based on the design value 50 of the gear inputted by the user, the outline geometry calculation unit 12 calculates the outline gear geometry value (theoretical value), and outputs the same as an outline geometry value 51.

Based on the design value 50 and the outline geometry value 51, the blank model creation unit 13 creates the pinion blank model 54a and the gear blank model 54b (which are not illustrated in FIG. 2) as 3-dimensional configuration data of the blank material of a pinion and a gear before the gear cutting. In addition, the blank model 54 in FIG. 2 indicates these models 54a and 54b collectively.

Based on the design value 50, the outline geometry value 51, and the target value 53 which is a target value of tooth-contact state predetermined by the user, the cutter specification calculation unit 14 calculates the cutter specification 55 as a geometric value of the configuration of the gear-cutting cutter.

Based on the outline geometry value 51, the cutter specification 55, and the target value 53, the machine setting calculation unit 15 calculates the machine setting of the gear cutting machine, and outputs the result as the machine setting 57.

Furthermore, the machine setting calculation unit 15 sets the machine setting 57 to the gear-cutting-machine model 58 which is 3-dimensional configuration data of the gear cutting machine which is created in advance.

Based on the design value 50, the outline geometry value 51, the cutter specification 55, and the machine setting 57, the performance/strength calculation unit 16 calculates the performance and strength of the gear that is set as the object of simulation, and outputs the performance/strength information 52.

Based on the performance/strength information 52, the performance/strength determination unit 17 determines whether the performance and strength of the gear that is set as the object of simulation are proper or not.

Based on the cutter specification 55, the cutter model creation unit 18 creates the cutter model 56 which is 3-dimensional configuration data of the gear-cutting cutter.

The gear-cutting simulation unit 19 arranges the blank model 54 to the gear-cutting-machine model 58 in which the cutter model 56 is installed, and performs the simulation of gear cutting. As a result of the simulation of gear cutting, the gear-cutting simulation unit 19 creates the pinion model 59a and the gear model 59b (which are not illustrated) which are 3-dimensional configuration data of the pinion and the gear after the gear-cutting simulation is carried out. In addition, the gear model 59 in FIG. 2 indicates these models 59a and 59b collectively.

The tooth-contact simulation unit 20 performs the tooth-contact simulation which changes the relative positions by rotating the pinion model 59a and the gear model 59b arranged in the assembled state, and analyzes the tooth-contact state. The tooth-contact simulation unit 20 outputs the tooth-contact state 60 as a result of the tooth-contact state simulation.

The determination unit 21 determines whether the tooth-contact state 60 satisfies the target value 53.

The heat-treatment simulation unit 22 performs the simulation of heat treatment of the gear model 59, and creates the pinion heat-treatment model 61a and the gear heat-treatment model 61b (which are not illustrated) as 3-dimensional configuration data of the pinion and the gear which are deformed with the heat treatment. In addition, the heat-treatment model 61 in FIG. 2 indicates these models 61a and 61b collectively.

As for the heat-treatment model 61, the surface treatment processing simulation unit 23 performs the simulation of surface treatment (lapping), and creates the pinion lapping model 62a and the gear lapping model 62b (which are not illustrated) as 3-dimensional configuration data of the pinion and the gear which are deformed with the surface treatment (lapping). The lapping model 62 in FIG. 2 indicates these models 62a and 62b collectively. In addition, as for the lapping model 62 which is created, the tooth-contact simulation unit 20 performs the tooth-contact simulation to analyze the tooth-contact state.

The correction tooth-contact state calculation unit 24 calculates how the tooth-contact state before performing the lapping and the heat treatment should be, in order to make the tooth-contact state 60 after the lapping satisfy the target value 53, when the tooth-contact state 60 analyzed by the tooth-contact simulation unit 19 with respect to the lapping model 62 does not satisfy the target value 53. Furthermore, the machine setting 57 for acquiring the tooth-contact state is calculated, and it is set to the gear-cutting-machine model 58 by the correction tooth-contact state calculation unit 24.

In addition, based on the machine setting 57 adjusted by the correction tooth-contact state calculation unit 24, the simulation of gear cutting is performed again and the analysis of the tooth-contact state is performed further.

The parameter adjustment unit 25 determines which of the cutter specification 55 and the machine setting 57 should be adjusted in order to create the gear model 59 from which the tooth-contact state 60 where the target value 53 may be satisfied is acquired, by referring to the adjustment parameter judgment table 30 when the tooth-contact state 60, analyzed by the tooth-contact simulation unit 19 with respect to the gear model 59, does not satisfy the target value 53.

Furthermore, the parameter adjustment unit 25 searches for and reads the adjustment value of the cutter specification 55 or the machine setting 57 from the adjustment parameter judgment table 30, and adjusts the cutter model 56 or the gear-cutting-machine model 58 based on the adjustment value read.

In addition, based on the cutter model 56 or the gear-cutting-machine model 58 adjusted by the parameter adjustment unit 25, the simulation of gear cutting is performed again and the analysis of the tooth-contact state is performed further.

Next, the processing of the gear cutting simulation device 10 of FIG. 2 will be explained. In this embodiment, the simulation of gear cutting of the pinion and gear pair will be explained.

Figure 3:
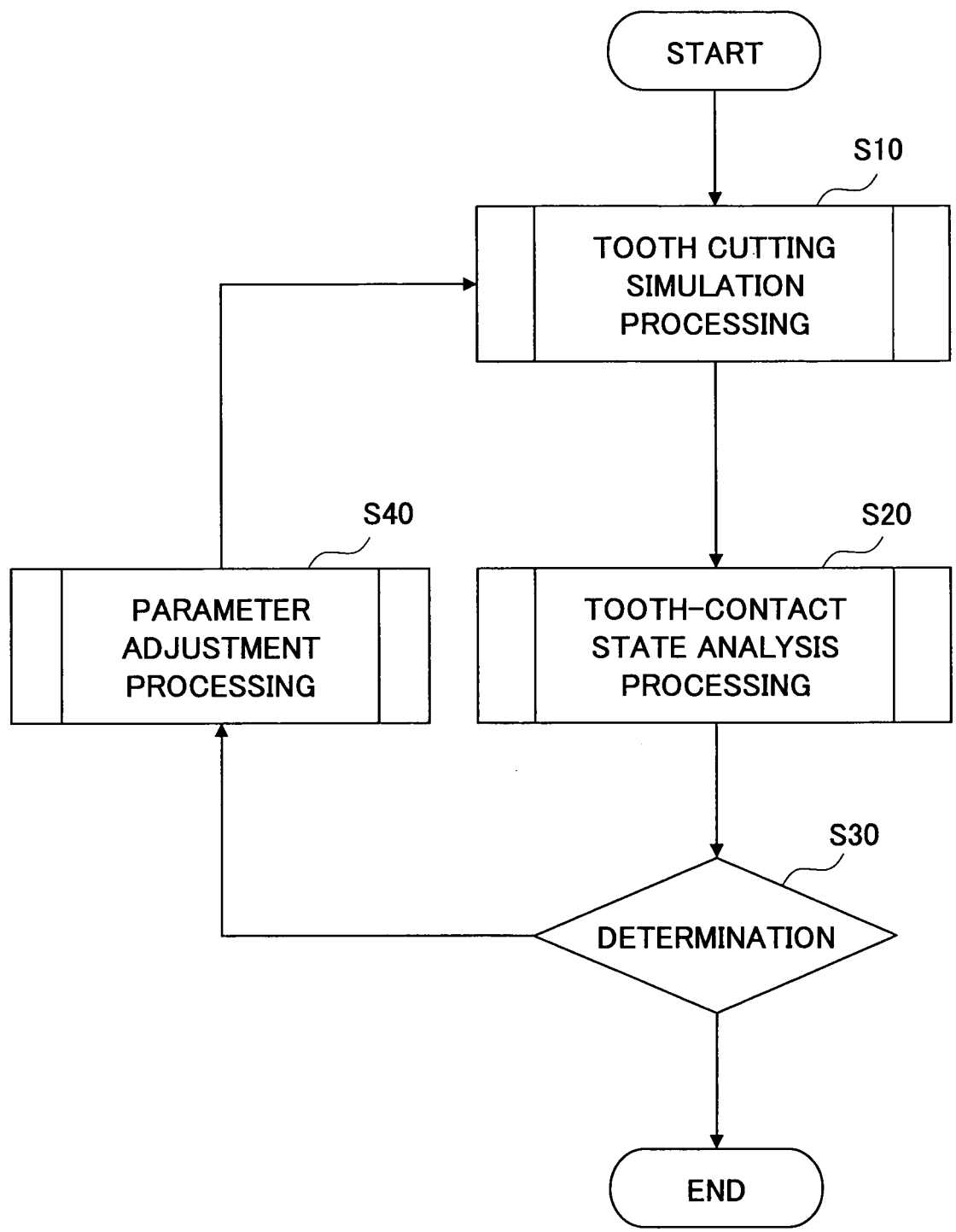
FIG. 3 is a flowchart for explaining the outline gear cutting simulation processing performed by the gear cutting simulation device in the present embodiment.

FIG. 3 is a flowchart for explaining the outline gear cutting simulation processing of the gear cutting simulation device 10.

In step S10, based on input values mentioned later, such as the gear design value, the gear cutting simulation device 10 creates the blank model 54 and the cutter model 56, and calculates the machine setting of the gear-cutting-machine model 58.

Furthermore, the gear cutting simulation device 10 arranges the blank model 54 while installing the cutter model 56 in the gear-cutting-machine model 58, and it performs the simulation of gear cutting. The gear cutting simulation device 10 creates the gear model 59 (or the pair of the gear model 59b and the pinion model 59a) as a result of the simulation of gear cutting.

Progressing to step S20 following step S10, the gear cutting simulation device 10 arranges the pinion model 59a and the gear model 59b, which are created at step S10, in the assembled state, and analyzes the tooth-contact state etc.

Progressing to step S30 following step S20, the gear cutting simulation device 10 determines the analysis result of the tooth-contact state. When the proper tooth-contact state is acquired as a result of the determination (which will be called the adoption), the gear cutting simulation device 10 outputs the gear geometry value and the gear cutting conditions, so that the processing is finished. In this case, the user is allowed to create the gear based on the outline geometry values and gear cutting conditions which are outputted by the gear cutting simulation device 10.

As a result of the determination, when the proper tooth-contact state is not acquired, it progresses to step S40, and the gear cutting simulation device 10 adjusts the cutting conditions of the cutter specification 55 and the machine setting 57, and performs the processing of the gear-cutting simulation from the step S10 again. Therefore, the gear cutting simulation device 10 repeats the processing of the steps S10 to S40 of FIG. 3 until it finds out the gear geometry value and the machining conditions that the proper tooth-contact state is acquired within the condition given with the design value 50.

Next, the details of each step of the outline processing of the gear cutting simulation device 10 will be explained.

Figure 4:
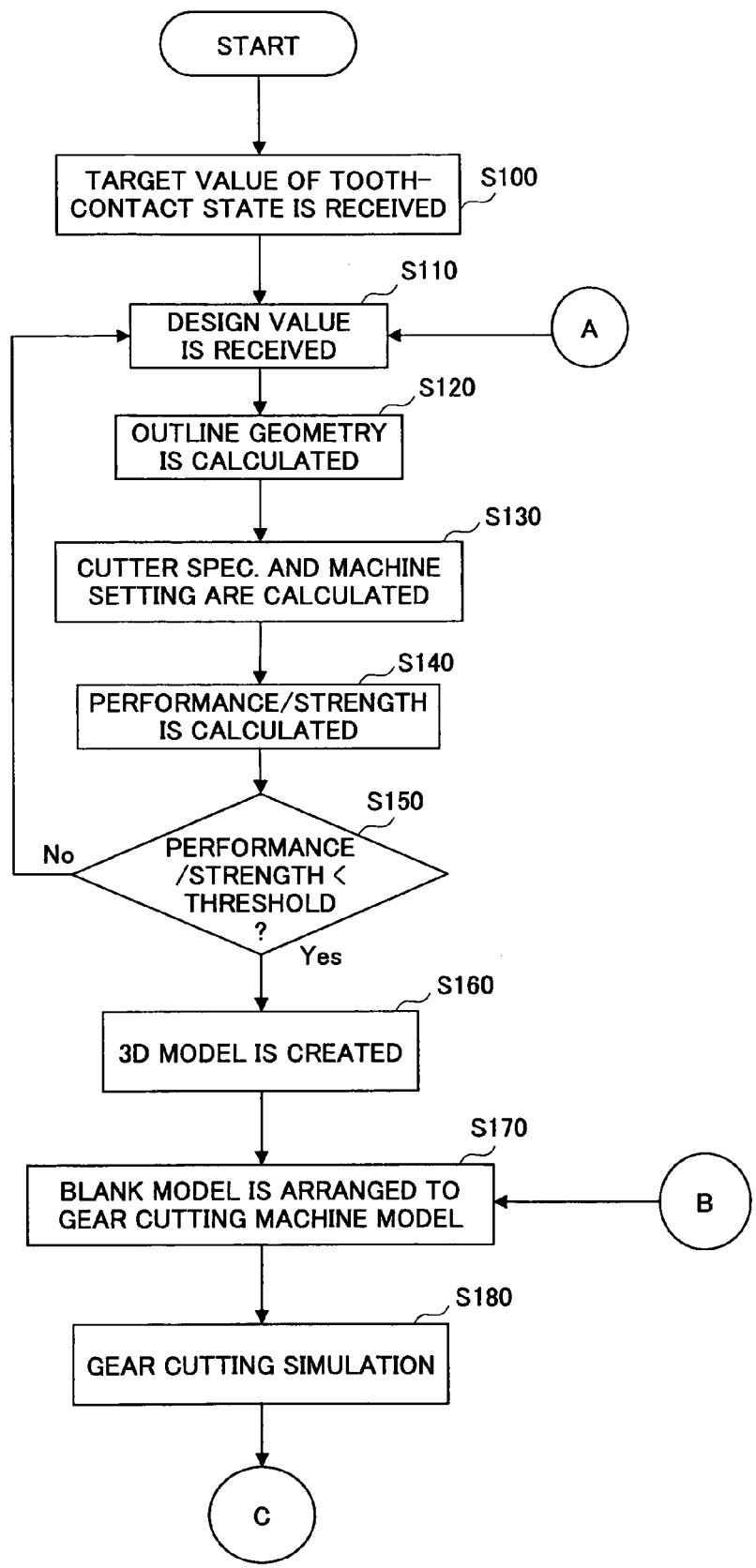
FIG. 4 is a flowchart for explaining the tooth cutting simulation processing in the outline gear cutting simulation processing of FIG. 3.

A description will be given of the gear-cutting simulation processing in step S10 of FIG. 3. FIG. 4 is a flowchart for explaining the gear-cutting simulation processing.

In step S100, the gear cutting simulation device 10 receives the target value 53 of the tooth-contact state set up by the user. The target value 53 received here is used as a reference value of determination of the adoption of the gear in the determination processing of the analysis result of the tooth-contact state described above in the step S30 of FIG. 3.

Figure 5A:
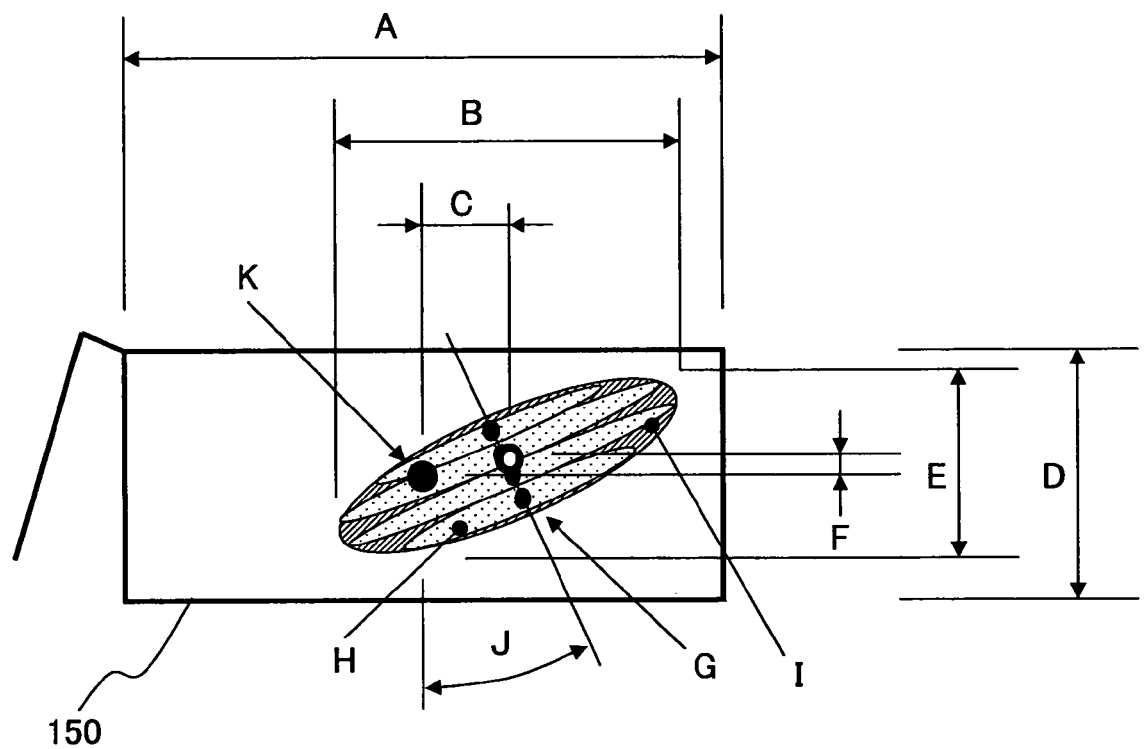

The parameters which are needed to understand the parameters of the target value 53 will be explained. FIG. 5A and FIG. 5B are diagrams for explaining the parameters for judging the tooth-contact state.

The rectangle 150 in FIG. 5A indicates the tooth flank of one tooth of the gear. Moreover, the remarks of the portions indicated by the alphabetical letters in FIG. 5A are given in FIG. 5B.

As shown in FIG. 5B, the parameter A is the length of effective tooth trace, the parameter B is the length of tooth contact in the direction of the tooth trace, the parameter C is the length from the center of the effective tooth flank in the direction of the tooth trace to the tooth-contact center, the parameter D is the working depth, the parameter E is the length of the tooth contact in the direction of the tooth depth, the parameter F is the length from the center of the effective tooth flank in the direction of the tooth depth to the tooth-contact center, the parameter G is the position of the center of the instantaneous tooth contact (the instantaneous point of contact), the parameter H is the area of the instantaneous tooth-contact, the parameter I is the total area of the tooth contact, the parameter J is the bias angle, and the parameter K is the center of the effective tooth flank.

In consideration of the above-mentioned parameters, the parameters which constitute the target value 53 will be explained. FIG. 6 shows an example of the judgment value of the tooth-contact state.

As shown in FIG. 6, the target value 53 is comprised of the seven parameters, and the judgment criteria and the judgment tolerance are set up for each parameter. The judgment criteria is the most desirable value, and it is used in order to calculate the deviation with the tooth-contact state 60 which it is as a result of analysis. Moreover, the judgment tolerance is used in order to determine whether the adoption of the tooth-contact state 60 is possible or impossible. That is, if the tooth-contact state 60 is within the tolerance, it is determined that the adoption is possible. If it is outside the tolerance range, it is determined that the adoption is impossible.

With reference to FIG. 5A, the seven parameters in FIG. 6 will be explained. The ratio of the tooth-contact area to the tooth-flank area, which is the first parameter in FIG. 6, is represented by the formula: $(I/(A \times D)) \times 100$ where the parameters of FIG. 5A are used. As shown in FIG. 6, the judgment criteria is set up to 25%, and the judgment tolerance is set up to 20-30%.

The ratio of the tooth-contact length in the tooth-trace direction to the effective-tooth-trace length, which is the second parameter in FIG. 6, is represented by the formula: $(B/A) \times 100$. As shown in FIG. 6, the judgment criteria is set up to 50%, and the judgment tolerance is set up to 40-60%.

The ratio of the tooth-contact length in the tooth depth direction to the working depth, which is the third parameter in FIG. 6, is represented by the formula: $(E/D) \times 100$. As shown in FIG. 6, the judgment criteria is set up to 60%, and the judgment tolerance is set up to 50-70%.

The deviation of the center of the tooth contact in the tooth trace direction, which is the fourth parameter in FIG. 6, is represented by the formula: $(C/A) \times 100$. As shown in FIG. 6, the judgment criteria is set up to 20%, and the judgment tolerance is set up to 15-25%.

The deviation of the center of the tooth contact in the tooth depth direction, which the fifth parameter in FIG. 6, is represented by the formula: $(F/D) \times 100$. As shown in FIG. 6, the criterion is set up to 10%, and the tolerance is set to 5-15%.

The angle indicated by the letter J in FIG. 5A is the bias angle, which is the seventh parameter in FIG. 6. As shown in FIG. 6, the criteria of the bias angle is set up to 30 degrees, and the tolerance is set up to −10% to +10%.

The position of the tooth contact can be determined using the six parameters mentioned above.

Figure 7:
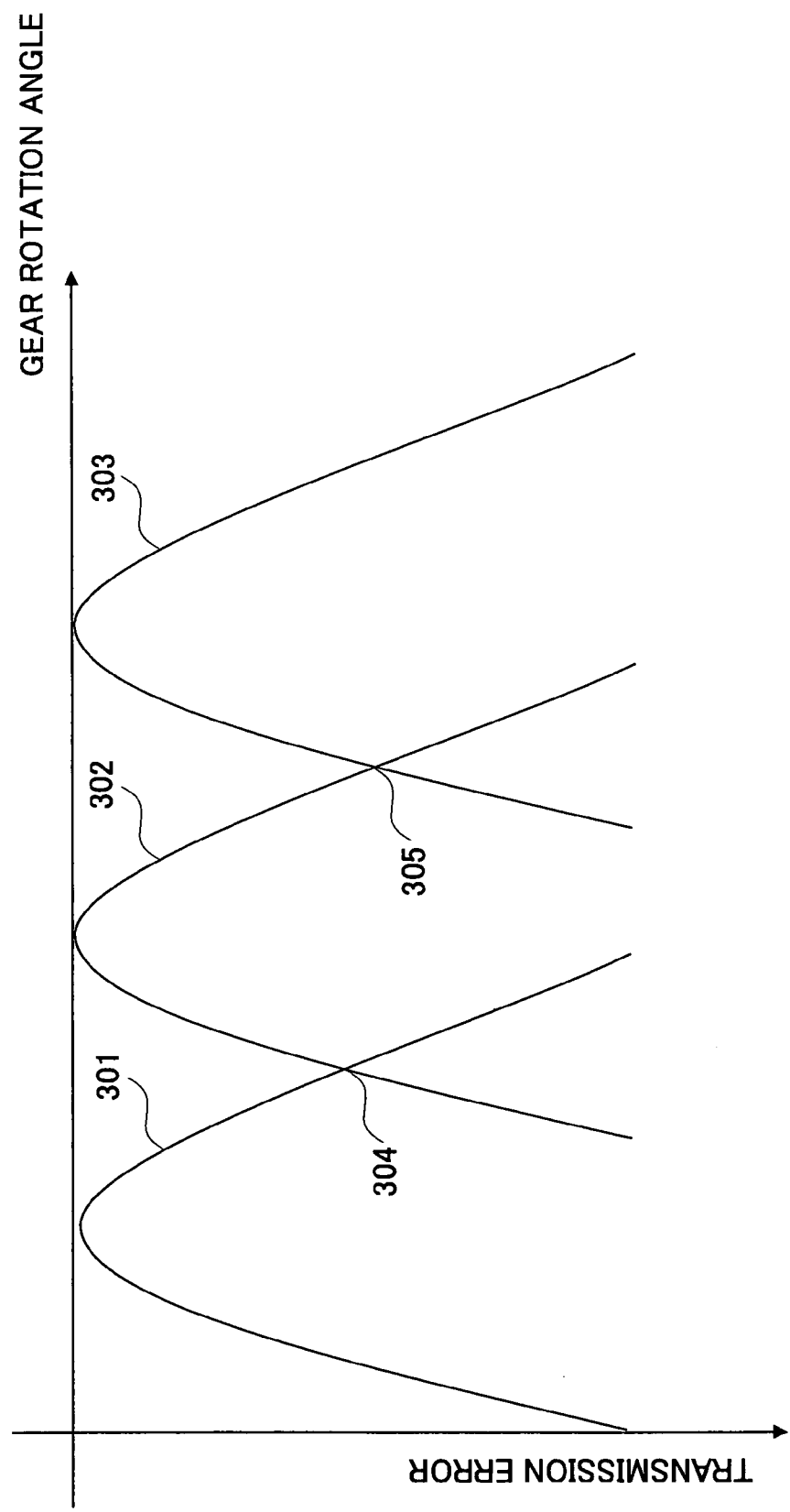
FIG. 7 is a diagram showing the condition in which adjacent transmission curves intersect at one point only.

Furthermore, the sixth parameter in FIG. 6, or "the adjacent transmission curves intersect only at one point" means that the engagement of the pinion and the gear is smooth. FIG. 7 shows the condition where the adjacent transmission curves intersect at one point only.

In FIG. 7, the axis of ordinate indicates the transmission error, the axis of abscissa indicates the gear rotation angle, and the three curves are the transmission curves with respect to one of the teeth of the gear, respectively.

As shown in FIG. 7, the transmission curve 301 and the transmission curve 302 which are adjacent to each other intersect at the point 304 only, and the transmission curve 302 and the transmission curve 303 which are adjacent to each other intersect at the point 305 only, and the judgment criterion that the adjacent transmission curves intersect at one point only is met.

For example, the condition where the adjacent transmission curves do not intersect at all indicates that engagement of the back tooth pair does not start even after engagement of the front tooth pair ends, and the transmission impact arises. The condition where the adjacent transmission curves intersect at two or more points indicates that the front tooth pair and the back tooth pair are alternately engaged repeatedly, the tooth contact is interrupted, which will produce the transmission noise.

Progressing to step S110 following step S100 of FIG. 4, the gear cutting simulation device 10 receives the design value 50 as a minimum condition value of the specifications of the gear and the cutter.

Figure 8:
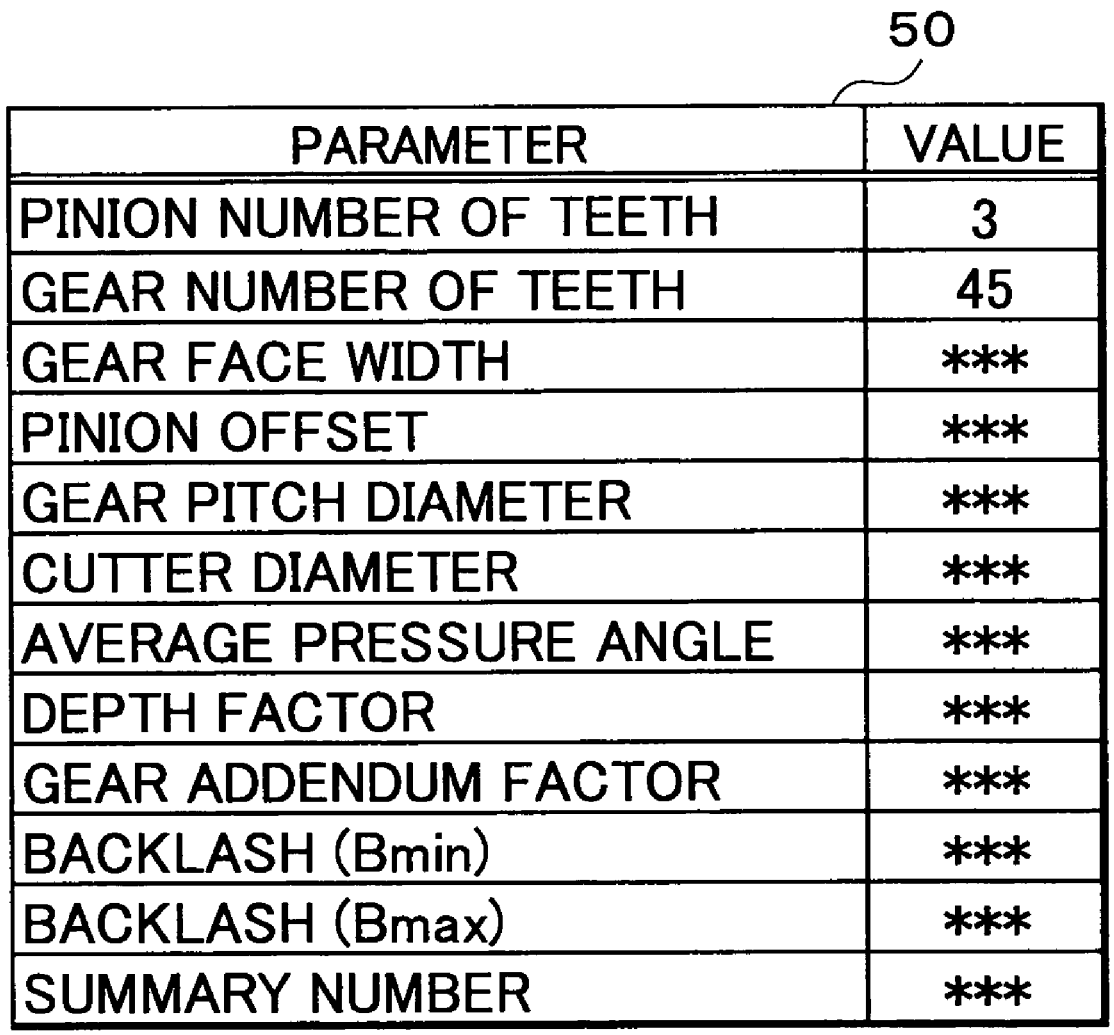
FIG. 8 is a diagram showing the parameters which form the design value.

FIG. 8 shows the parameters which form the design value 50. The design value 50 is stored in the file in the table format including the number of teeth of the pinion, the number of teeth of the gear, the face width of the gear, the pinion offset, the pitch diameter of the gear, the diameter of the cutter, the average pressure angle, the tooth depth factor, the gear addendum factor, the backlash (Bmin), the backlash (Bmax), and the summary number, as shown in FIG. 8.

The user designs each parameter of the design value 50 in advance as the minimum conditions. In addition, the summary number is used for identifying the design value 50.

Progressing to step S120 following step S110, the outline geometry calculation unit 12 of the gear cutting simulation device 10 calculates the item as a theoretical value of the gear and the cutter, and outputs the outline geometry value 51.

The outline geometry value 51 is outputted about the information about the whole blank configuration, and the information about the one gear tooth.

FIG. 9 shows the outline geometry values of the blank configuration outputted by the outline geometry calculation.

The parameters shown in FIG. 9 are related to the whole blank configuration among the outline geometry values 51. The parameters include, as the parameters whose values are different for the pinion and the gear, the number of teeth, the pitch diameter, the addendum, the dedendum, the outside diameter, the pitch apex beyond the contact point, the face apex beyond the contact point, the root apex beyond the contact point, the distance from the crown to the contact point, the distance from the front crown to the contact point, the pitch angle, the face angle, the root angle, and the spiral angle. The parameters include, as the parameter for the pinion only, the pinion offset, include, as the parameters for the gear only, the outer module and the face width, and includes, as the parameters whose values are the same for the pinion and the gear, the average pressure angle, the cutter diameter, and the whole depth. These parameters are outputted to the file in the table format shown in FIG. 9, for example.

Moreover, FIG. 10 shows the outline geometry value of one gear tooth outputted by the outline geometry calculation. The parameters shown in FIG. 10 are related to one gear tooth among the outline geometry values 51.

As a parameter with which the values differ about the pinion and the gear, average pitch radii, the average cone distance, the average addendum, the average cutter dedendum, average tooth thickness, average tip width of face, and the dedendum angle. It is outputted to the file in the table format including the average normal module, the clearance, the average tooth depth, and the marginal angle of obliquity of action as a parameter used as the pinion and the value same about the gear, for example, shown in FIG. 10.

Progressing to step S130 following step S120, the cutter specification calculation unit 14 of the gear cutting simulation device 10 calculates the specification of the cutter based on the design value 50 and the outline geometry value 51.

Furthermore, the machine setting calculation unit 15 of the gear cutting simulation device 10 sets machine setting 57 as the gear-cutting-machine model 58 while it calculates the machine setting of the gear-cutting-machine model 58 and outputs it as machine setting 57 based on the outline geometry value 51, the target value 53, and the cutter specification 55.

FIG. 11 is a diagram for explaining the cutter specification. The cutter specification 55 is outputted to the file in the table format including the diameter of the cutter, the outside blade angle, the inside blade angle, and the face width, as shown in FIG. 11. In addition, the output values of the diameters of the cutter and the gear are the same, and the output values of other parameters are different and they are outputted for the pinion and the gear respectively.

Moreover, FIG. 12 is a diagram for explaining the machine setting of the gear cutting machine. The machine setting 57 includes, as the parameters having different values for the pinion and the gear, the machine root angle, the machine center to back, the eccentric angle, and the cradle angle. The machine setting 57 includes, as the parameters for the pinion only, the sliding base, the blank offset, the swivel angle, the spindle rotation angle, the start roll angle (which determines the start position of the cradle angle), the end roll angle type (which determines the end position of the cradle angle), and the decimal ratio. And it is outputted to the file in the table format shown in FIG. 12.

Progressing to step S140 following step S130 of FIG. 4, the performance/strength calculation unit 16 of the gear cutting simulation device 10 performs the gear performance and strength calculation which it creates based on the design value 50, the outline geometry value 51, the cutter specification 55, and machine setting 57.

The performance and strength calculation include the two phases, the calculation concerning the configuration, and the calculation concerning load conditions.

The calculation concerning the configuration calculates the factor which is created only from the configuration information such as the outline geometry value 51.

The calculation concerning load conditions calculates the strength at the time of giving arbitrary input capacity and input rotation speed using the above factor.

The performance/strength calculation unit 16 extracts or calculates the necessary parameters from among the outline geometry value 51, the cutter specification 55 and the machine setting 57 as the input parameters of the preparative calculation phase, and outputs the parameters as shown in FIG. 13.

FIG. 13 shows the input parameters of the configuration-related calculation in preparation of the performance/strength calculation.

The input parameters of the calculation concerning the configuration are based on the design value 50, the outline geometry value 51, the cutter specification 55, and the machine setting 57.

As the input parameters whose values are different for the pinion and the gear, the number of teeth, the pitch diameter, the spiral angle, the pitch angle, and the mean pitch radius are provided. As the input parameters for the pinion only, the pinion offset, the pinion average cone distance, the distance from the intersection of the pinion to the end surface of the bevel gear, the distance from the intersection of the pinion to the tip of the bevel gear, and the cutter tip face width are provided. As the input parameter for the gear only, the face width is provided, and as the input parameters whose values are the same for the pinion and the gear, the mean pressure angle, the tooth depth factor, the gear addendum factor, and the summary number are provided. The input parameters are outputted to the file in the table format shown in FIG. 13, for example.

The performance/strength calculation unit 16 performs the configuration-related calculation in preparation of the performance and strength calculation based on the input parameters of FIG. 13, and outputs the parameters of FIG. 14 as the calculation result.

FIG. 14 shows the output result of the configuration-relation calculation in preparation of the performance and strength calculation. The output result of the configuration-related calculation includes, as the parameters whose values are different for the pinion and the gear, the number of teeth, the means pitch radius, the means cone distance, the means whole depth, the means tooth thickness, the means tooth top land, the pitch diameter, the cutter edge radius, and the geometric factor-J (which is the factor for determining the bending stress). The output result of the configuration-related calculation includes, as the parameter for the gear only, the mean normal module, and includes, as the parameters whose values are the same for the pinion and the gear, the outer module, the relative curvature, the load sharing ratio, the length of contact, the geometric factor-I (which is the factor for determining the planar pressure), and the contact ratios (the transverse plane, the overlap, the composition). These parameters are outputted to the file in the table format shown in FIG. 14, for example.

Furthermore, the performance/strength calculation unit 16 performs the performance and strength calculation for the input parameters of FIG. 15 based on the output result of the configuration-related calculation of FIG. 14.

FIG. 15 shows the input parameters for the performance and strength calculation. There are the input power and the input rotation speed as the input parameters of the analysis phase. The values of the input power and the input rotation speed being analyzed are inputted to the file in the table format shown in FIG. 15, and then the performance/strength calculation unit 16 calculates the performance and strength of the pinion and the gear in response to the input power and the input rotation speed which are inputted. And the performance/strength calculation unit 16 outputs the calculation result to the file in the table format shown in FIG. 16.

FIG. 16 shows the output result of the performance and strength calculation. The output result of the performance and strength calculation includes, as the parameter whose value is different for the pinion and the gear, the bending stress, and includes, as the parameters whose values are the same for the pinion and the gear, the contact stress, the sliding velocity, the allowable transmitted power, and the efficiency.

Progressing to step S150 following step S140 of FIG. 4, the performance/strength determination unit 17 of the gear cutting simulation device 10 determines whether the performance/strength information 52 including the parameters shown in FIG. 14 and FIG. 16 meets the predetermined criteria (the threshold).

When the strength does not meet the criteria, it progresses to step S110 of FIG. 4, and the gear cutting simulation device 10 performs again the simulation with a different design value 50. When the strength meets the criteria, it progresses to step S160.

In step S160, the gear cutting simulation device 10 creates the blank model 54 (pinion blank model 54*a*, gear blank model 54*b*) based on the design value 50 and the outline geometry value 51, as a 3-dimensional geometric blank model of the gear (the pinion, the gear). Further, as a 3-dimensional geometric cutter model, the gear cutting simulation device 10 creates the cutter model 56 (cutter model 56*a* for the pinion, cutter model 56*b* for the gear) based on the cutter specification 55.

Progressing to step S170 following step S160, the gear-cutting simulation unit 19 of the gear cutting simulation device 10 arranges the blank model 54 and installs the cutter model 56 in the gear-cutting-machine model 58.

Figure 17:
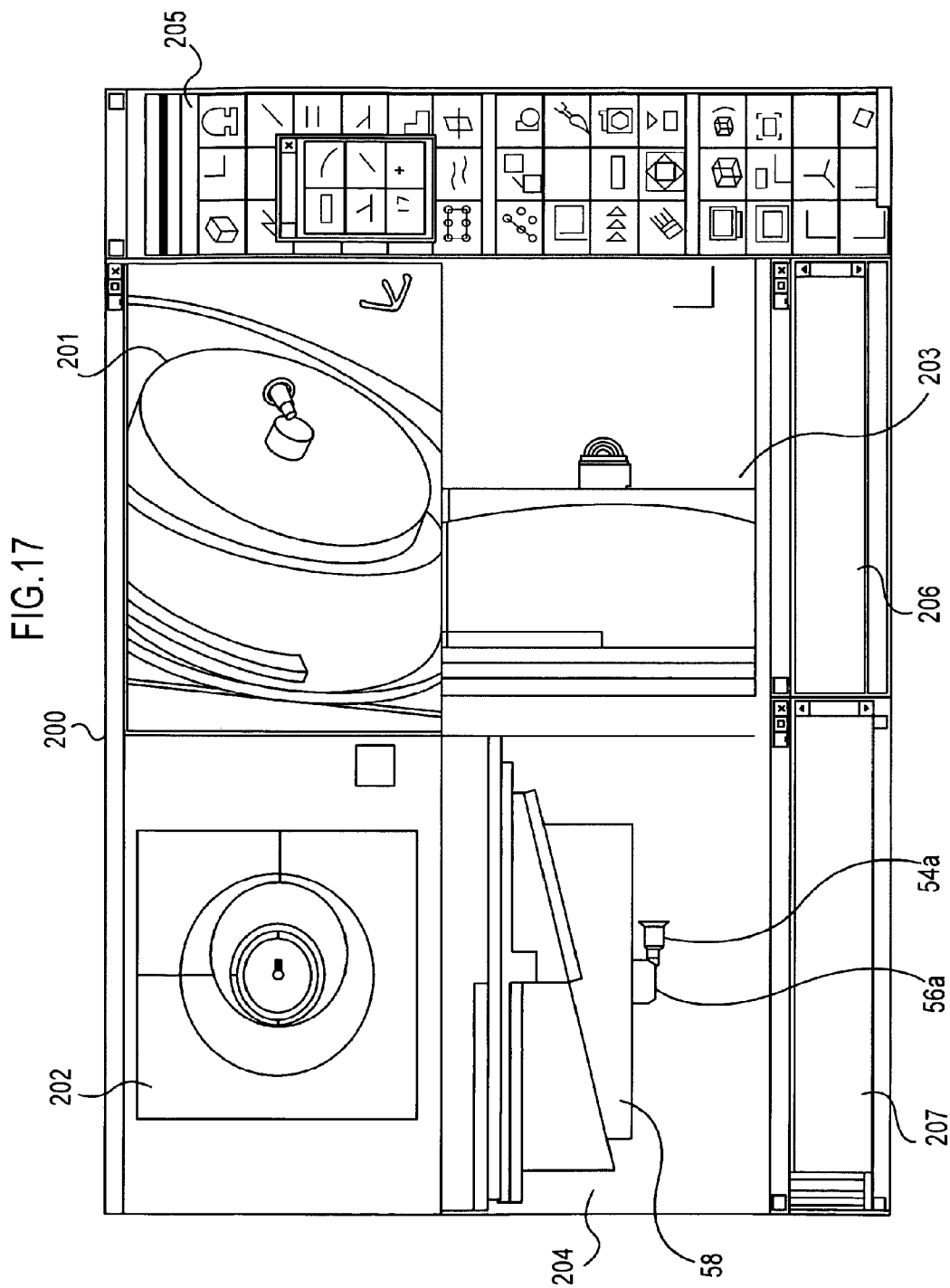
FIG. 17 is a diagram showing an example of the screen indicating the arrangement of the pinion blank model to the gear cutting machine model.

FIG. 17 shows an example of the screen which indicates the arrangement of the pinion blank model to the gear-cutting-machine model.

The CAD screen 200 of FIG. 17 is the screen which the gear cutting simulation device 10 displays on the display device 105. The CAD screen 200 has the four windows 201, 202, 203, and 204, menus 205, and message regions 206 and 207.

The windows 201, 202, 203, and 204 show signs that cutter model 56*a* for the pinions and pinion blank model 54*a* are arranged, from the direction different, respectively on the gear-cutting-machine model 58.

The menu 205 is for the user of the gear cutting simulation device 10 inputting. The user can let the menu 205 pass and can operate the gear cutting simulation device 10.

The message regions 206 and 207 are the regions where the input promotion message to which the input is urged, the processing result, etc. are displayed on the notice when the abnormalities occur for simulation, and the user. In addition, the screen 200 changes about the example of the screen in subsequent explanation.

In the example of FIG. 17, neither the arbor of the gear-cutting-machine model 58 nor the work head is displayed on the CAD screen 200, for the sake of convenience. However, as shown in FIG. 18, displaying the arbor and the work head is possible.

Figure 18:
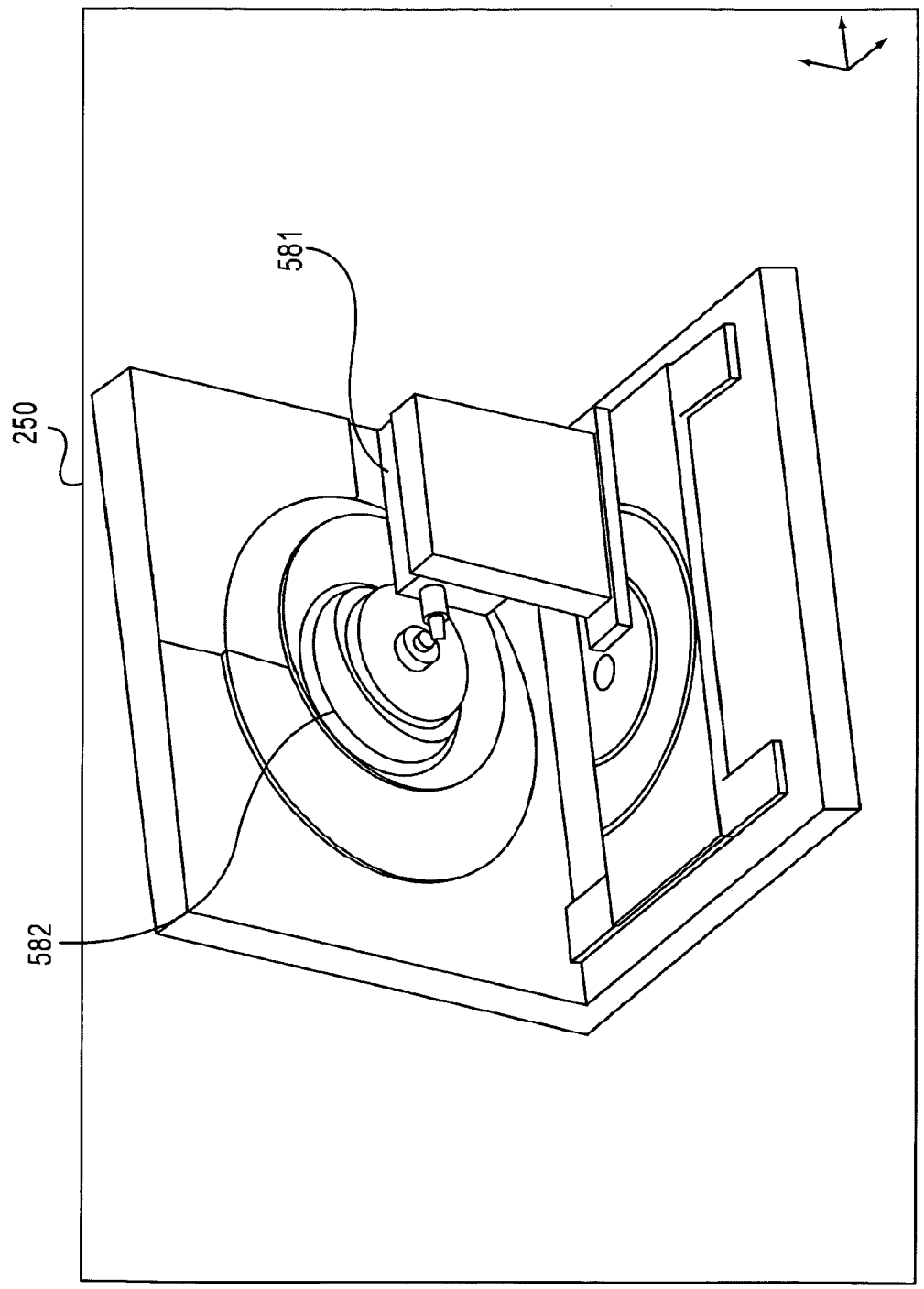
FIG. 18 is a diagram showing an example of the screen indicating the arrangement of the pinion blank model to the gear cutting machine model.

FIG. 18 shows an example of the screen which indicating the arrangement of the pinion blank model to the gear-cutting-machine model.

As shown in the CAD screen 250, the interference between the arbor 581 and the cutter spindle 582 can be checked by displaying the arbor 581 on the screen.

In addition, the menu 205 and the message regions 206 and 207 which are displayed in the CAD screen 200 of FIG. 17 are not illustrated in the CAD screen 250 of FIG. 18, for the sake of convenience. However, they can be similarly displayed in the CAD screen 250.

In the following description, the illustration of the menu 205 and the message regions 206 and 207 will be omitted for the sake of convenience.

Figure 19:
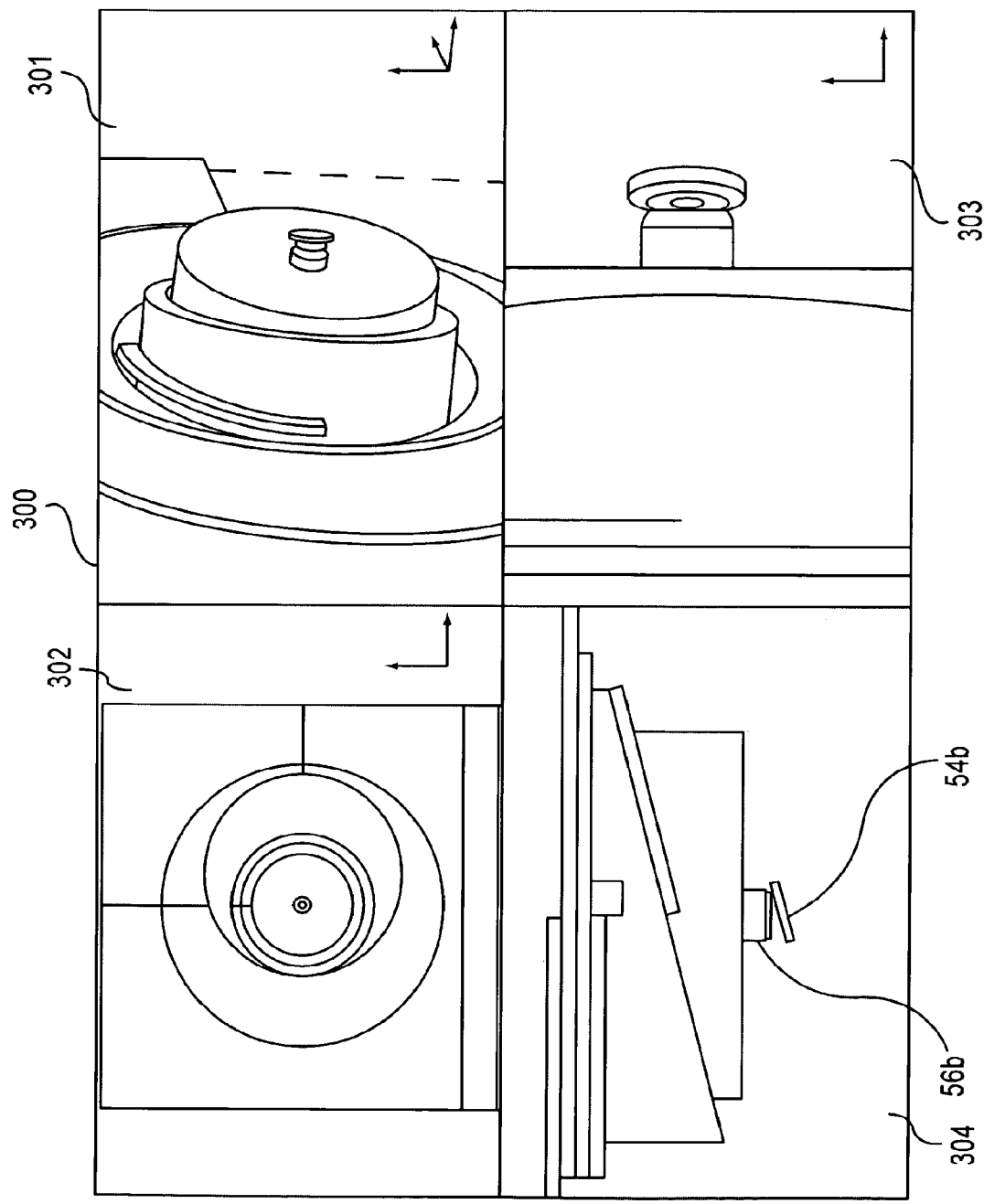
FIG. 19 is a diagram showing an example of the screen indicating the arrangement of the gear blank model to the gear cutting machine model.

FIG. 19 shows an example of the screen which indicates the arrangement of the gear blank model to the gear-cutting-machine model. The windows 301, 302, 303, and 304 of the screen 300 of FIG. 19 respectively indicate the situations in different directions that the cutter model 56b for the gear and the gear blank model 54b are arranged on the gear-cutting-machine model 58.

Figure 20:
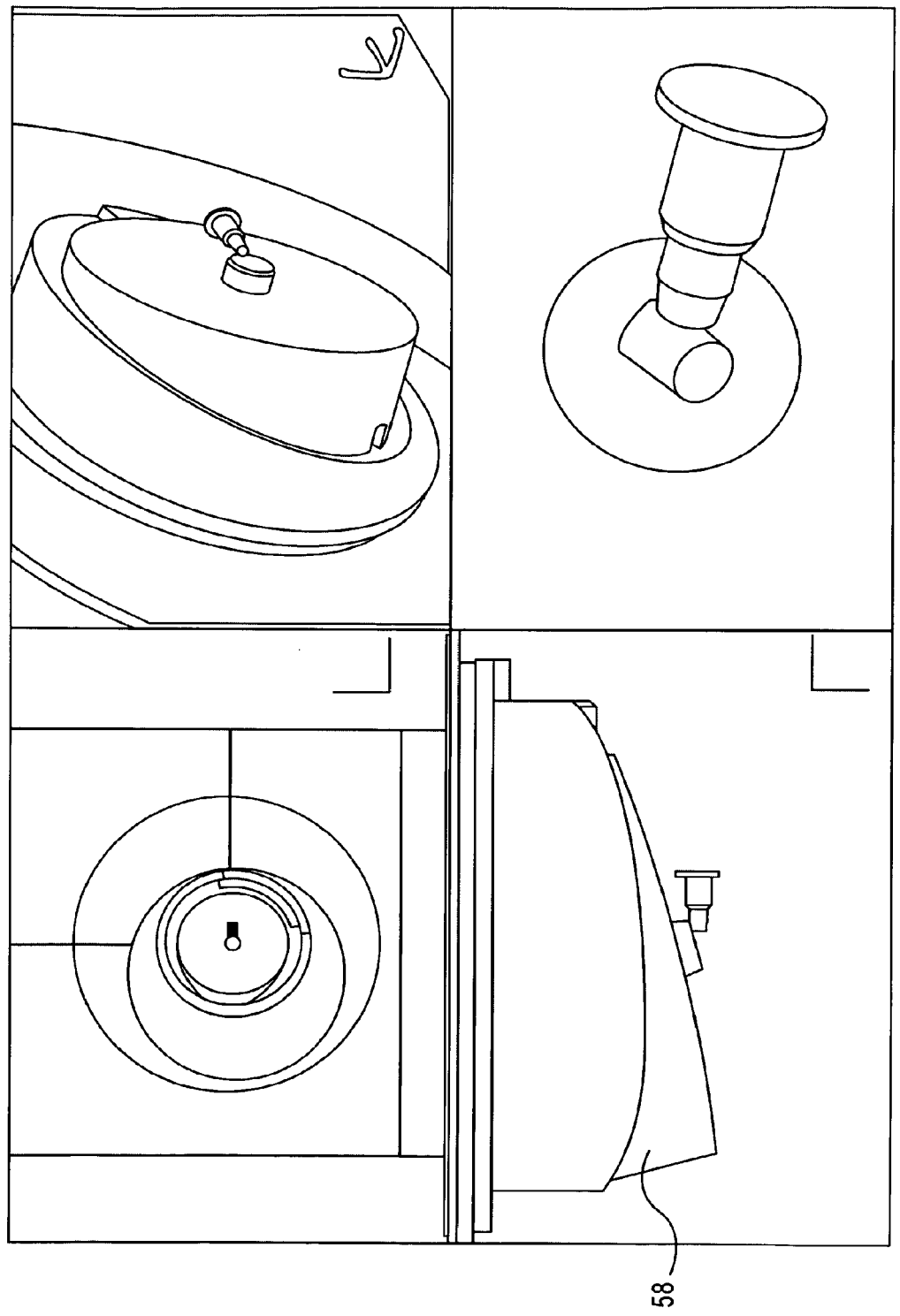
FIG. 20 is a diagram showing an example of the screen indicating the arrangement of the pinion blank model to the gear cutting machine model with a different machine setting.

FIG. 20 shows an example of the screen which indicates the arrangement of the pinion blank model to the gear-cutting-machine model with different machine setting. It is shown that the gear-cutting-machine model 58 of FIG. 20 is slanted when compared with the gear-cutting-machine model 58 of FIG. 17. Thus, it is possible to change the relative position of the blank model 54 and the cutter model 56 by changing the machine setting 57 of the gear-cutting-machine model 58, and thereby the configuration of the resulting gear model 59 can be changed.

Progressing to step S180 following step S170 of FIG. 4, the gear-cutting simulation unit 19 of the gear cutting simulation device 10 performs the simulation which carries out the gear cutting of the blank model 54 arranged on the gear-cutting-machine model 58 by the cutter model 56, and creates the gear model 59.

Figure 21:
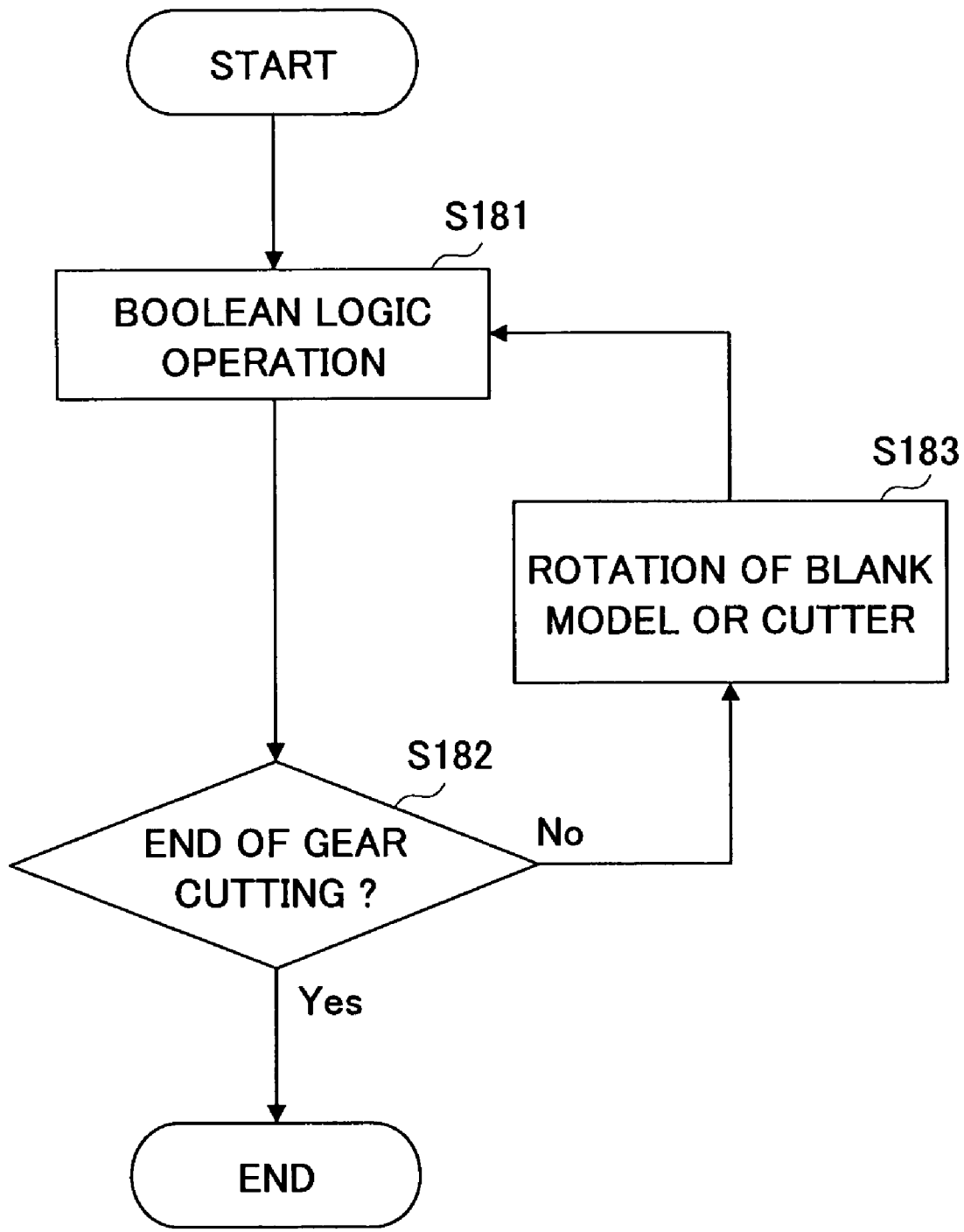
FIG. 21 is a flowchart for explaining the processing of the gear cutting simulation.

A description will be given of the simulation processing of the gear cutting in the step S180. FIG. 21 is a flowchart for explaining the simulation processing of the gear cutting.

In step S181, the gear-cutting simulation unit 19 of the gear cutting simulation device 10 performs processing of the Boolean logic operation of the blank model 54 and the cutter model 56, i.e., removing of the part which overlapping with the cutter model 56 from the blank model 54.

Progressing to step S182 following step S181, the gear-cutting simulation unit 19 determines whether the gear cutting is performed with a sufficient number of teeth needed to perform the tooth-contact state analysis processing which will be mentioned later.

When the gear cutting is already performed with the sufficient number of teeth, the gear-cutting simulation unit 19 finishes the processing. Otherwise the control is transferred to step S183.

In step S183, since the gear-cutting simulation unit 19 is based on the generate-gear-cutting method when the blank model 54 is pinion blank model 54a, it rotates the blank model 54 and the cutter model 56 by each revolving shaft.

In addition, the more the rotation include angle is fine, the more the near tooth form can be obtained according to the reality. Since it is based on the forming gear-cutting method when the blank model 54 is gear blank model 54b, only the blank model 54 is rotated by the revolving shaft.

Progressing to step S181 following step S183, the gear-cutting simulation unit 19 repeats the processing after step S181 by the new relative position of the blank model 54 by rotation of blank model 54, and the cutter model 56.

Figure 22:
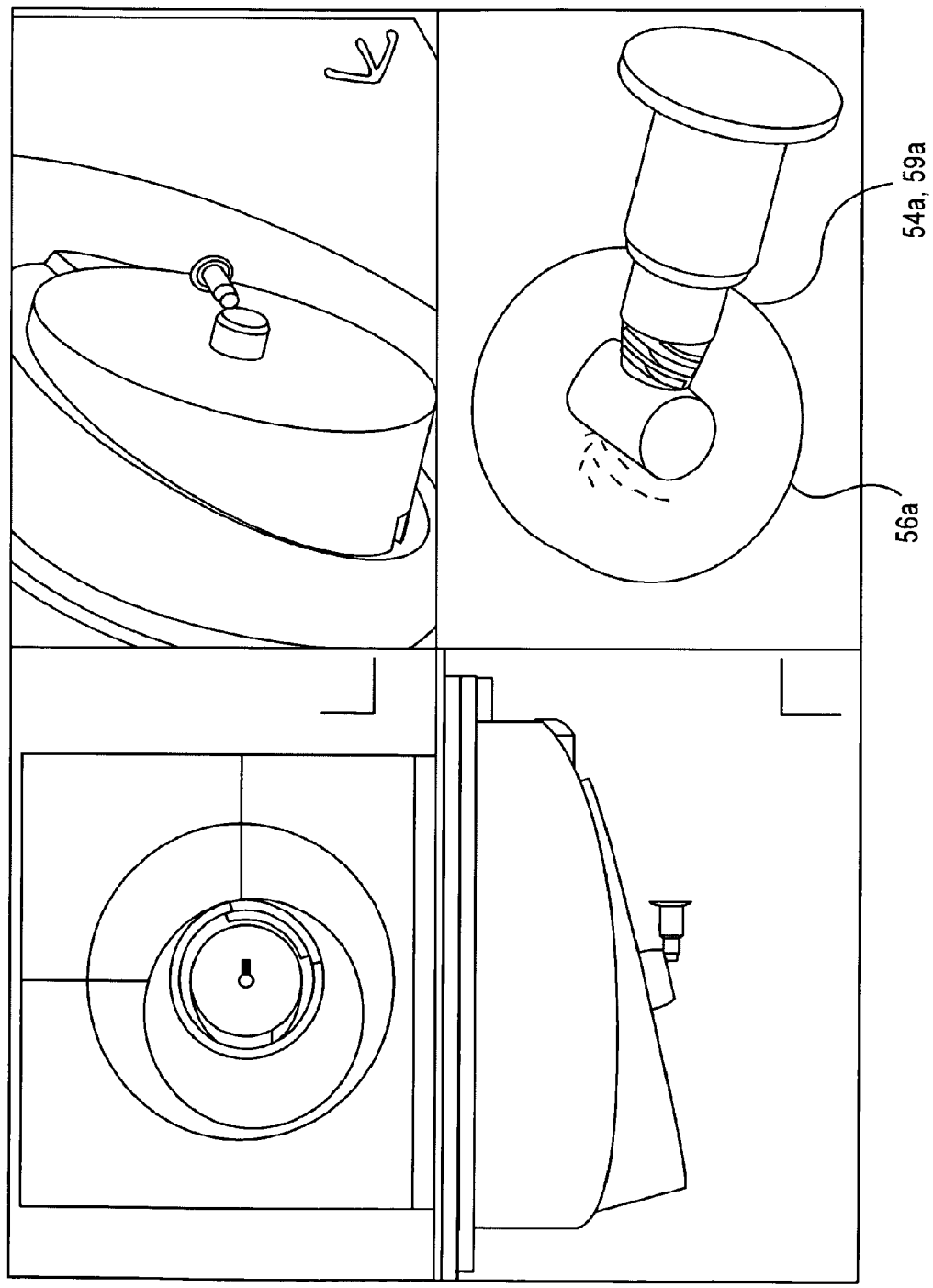
FIG. 22 is a diagram showing an example of the screen indicating the simulation of tooth cutting of the pinion blank model.

FIG. 22 shows an example of the screen which carries out the simulation of the gear cutting of the pinion blank model.

In FIG. 22, the gear cutting of the pinion blank model 54a is carried out by the cutter model 56a for the pinion, so that the pinion model 59a is created.

Figure 23:
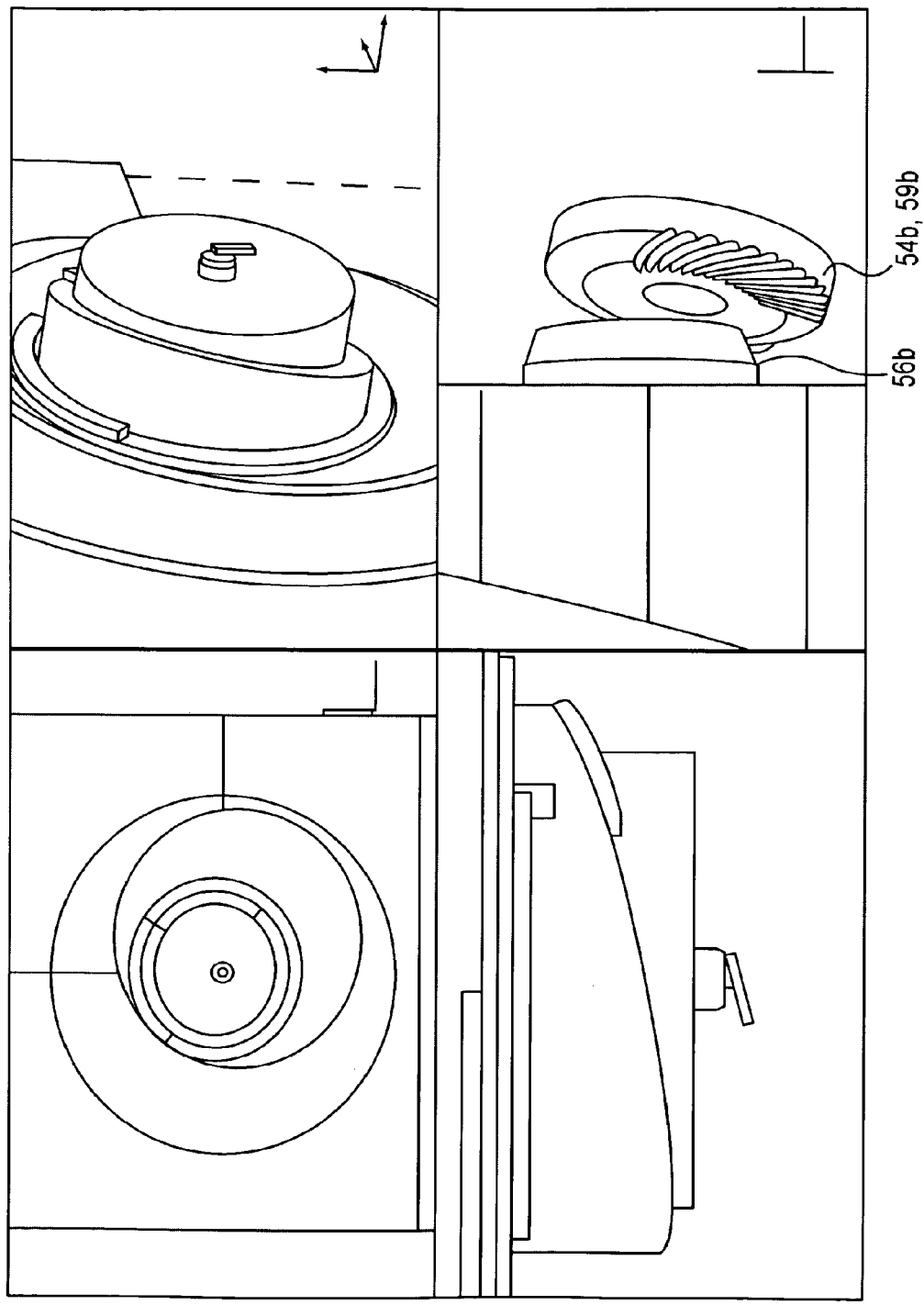
FIG. 23 is a diagram showing an example of the screen indicating the simulation of tooth cutting of the gear blank model.

FIG. 23 shows an example of the screen which carries out the simulation of the gear cutting of the gear blank model.

In FIG. 23, the gear cutting of the gear blank model 54b is carried out by the cutter model 56b for the gear, so that the gear model 59b is created.

Figure 24:
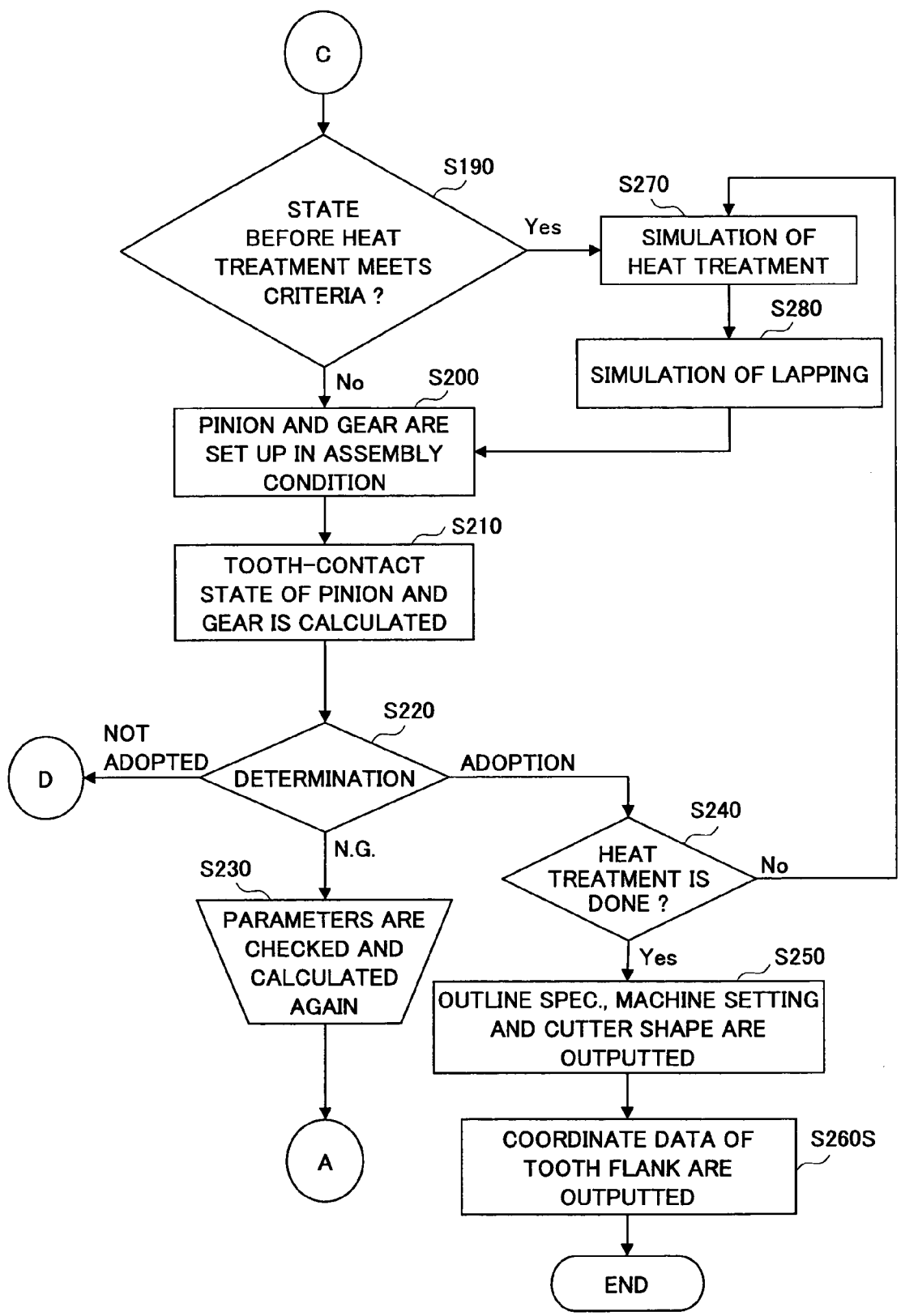
FIG. 24 is a flowchart for explaining the processing of tooth-contact state analysis and determination in the outline gear cutting simulation processing of FIG. 3.

Next, a description will be given of the processing of the tooth-contact state analysis and determination using the created pinion model 59a and gear model 59b in the steps S20 and S30 of FIG. 3. FIG. 24 is a flowchart for explaining the tooth-contact state analysis and determination processing.

In step S190, the tooth-contact simulation unit 20 of the gear cutting simulation device 10 determines whether it is what is determined as the gear model 59 in the state, i.e., the state created by the gear-cutting simulation unit 19, before simulation of heat treating mentioned later or surface treatment processing is performed already satisfying the target value 53 of the tooth-contact state by the processing mentioned later.

Since the analysis of the tooth-contact state is not performed initially, the target value 53 of the tooth-contact state is not satisfied. The control is transferred to step S200.

In step S200, the tooth-contact simulation unit 20 arranges the pinion model 59a and the gear model 59b, which are created by the gear-cutting simulation unit 19, in the assembled state which is the actual use state.

Figure 25:
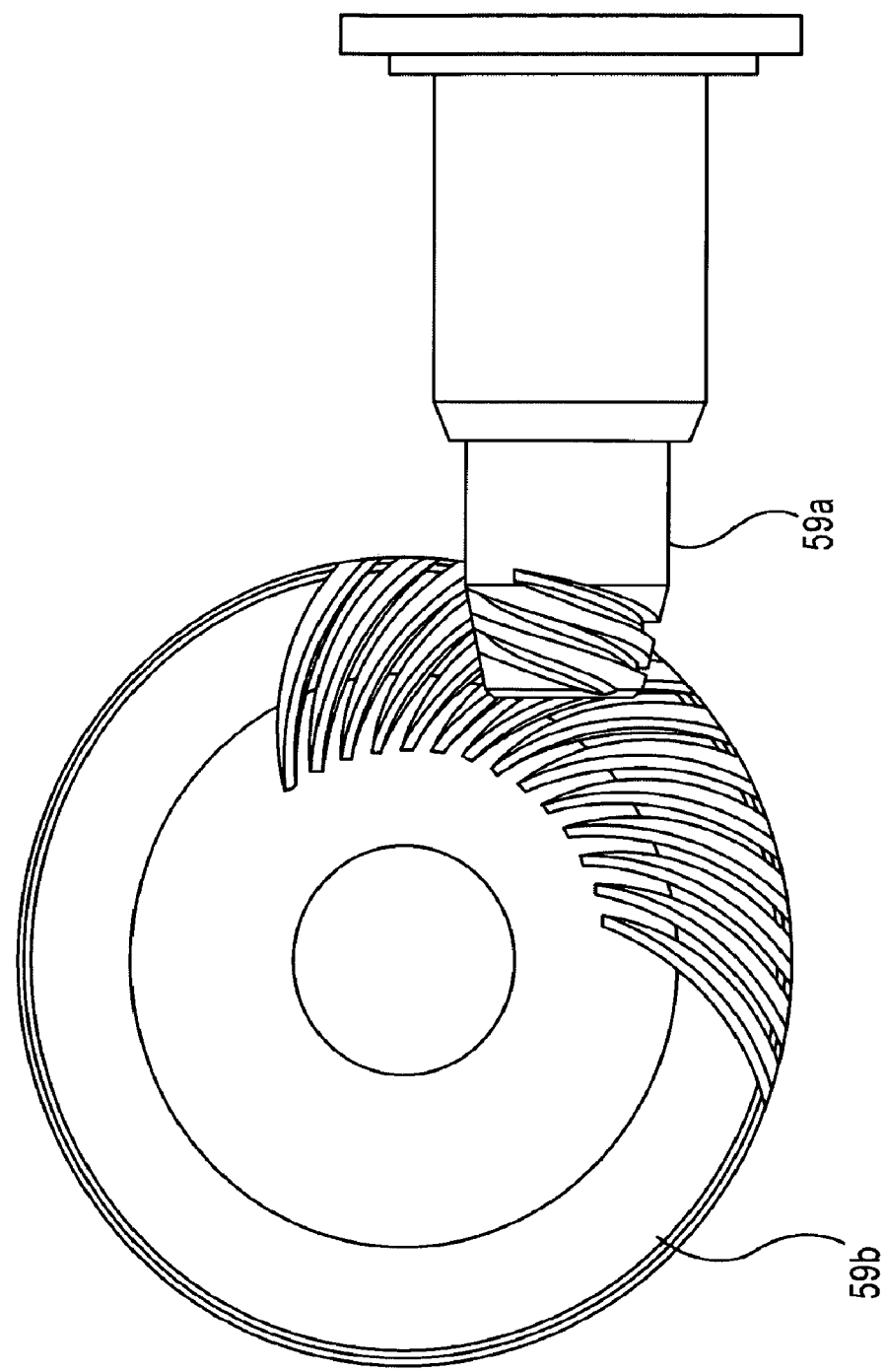
FIG. 25 is a diagram showing an example of the screen indicating the arrangement of the pinion model and the gear model which are set up in the assembled condition.

FIG. 25 shows an example of the screen which indicates the arrangement of the pinion model and the gear model in the assembled state. As shown in FIG. 25, the pinion model 59a and the gear model 59b are arranged at the assembled state.

Progressing to step S210 following step S200, the tooth-contact simulation unit 20 calculates the tooth-contact state 60 by performing the simulation which rotates the pinion model 59a and gear model 59b in the assembled state of FIG. 25, and outputs the tooth-contact state 60 with the same parameters as the parameters of the target value 53 in FIG. 6.

Figure 26:
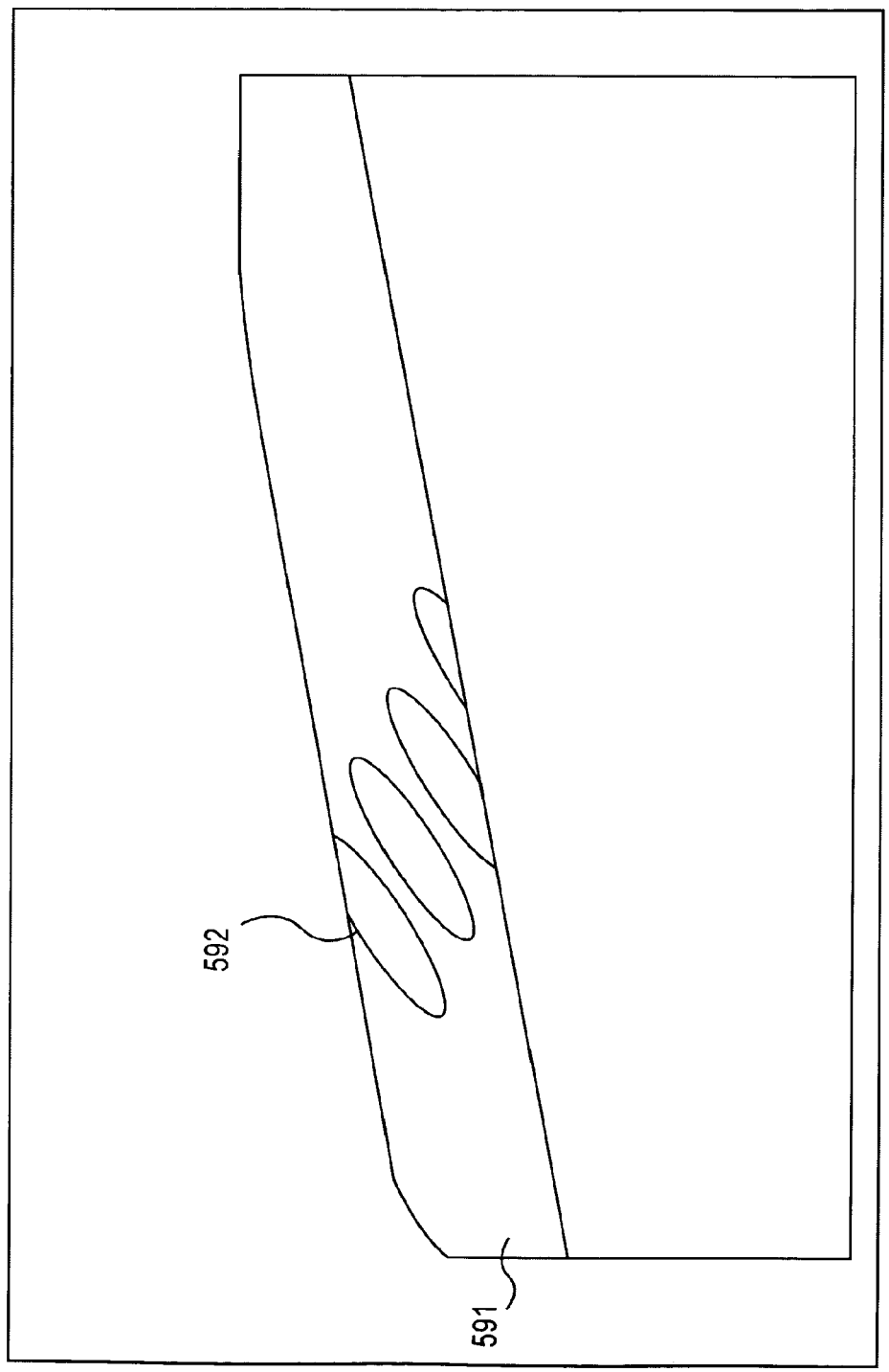
FIG. 26 is a diagram showing an example of the screen indicating the tooth-contact state of the gear model.

In addition, the tooth-contact state 60 can be checked also on the screen. FIG. 26 shows an example of the screen which indicates the display of the tooth-contact state.

The portion, indicated by reference numeral 591 in FIG. 26, shows one gear tooth of the gear model 59b, and the ellipse part, indicated by reference numeral 592 in FIG. 26, shows the instantaneous tooth-contact area.

Progressing to step S220 following step S210, the determination unit 21 of the gear cutting simulation device 10 determines whether the tooth-contact state 60 acquired at step S210 is in the judgment tolerance of the target value 53 of FIG. 6. Moreover, it determines whether the tooth-contact state 60 is the not-good tooth-contact state. The not-good tooth-contact state means the state where the tooth-contact state 60 is greatly different from the target value 53, and there is a possibility of the input mistake of the design value 50.

FIG. 27 shows the threshold for judging the not-good tooth contact. In FIG. 27, the threshold of the not-good tooth contact is shown for each of the same parameters as the parameters for the determination in FIG. 6. When it is determined that one of the parameters is not good, it is determined as being the not-good tooth-contact state. For example, if the ratio of the tooth-contact area to the area of the tooth flank is smaller than 2.5%, it is determined as being the not-good tooth contact.

In step S220 of FIG. 24, if the determination unit 21 determines the not-good tooth contact, it will progress to step S230.

In step S230, the user checks again whether there are any abnormalities in the machine setting 57, the assembly position of the pinion model 59a and the gear model 59b in the step S200, or the outline geometry value 51. Moreover, the user checks also whether the deformation of the gear model 59 by the simulation of the heat treatment or lapping which will be mentioned later is excessive or not. If there is any abnormality, the new design value 50 is inputted through the recalculation, and the processing from the step S10 of FIG. 4 is performed again.

When it is determined in the step S220 that the tooth-contact state 60 is not the proper tooth-contact state although it is not the not-good tooth contact (or when it is outside the judgment tolerance of the target value 53), the determination unit 21 determines that the created gear model 59 is not adopted. In this case, the gear cutting simulation device 10 performs the parameter adjustment processing which will be mentioned later, and performs again the simulation processing of the gear cutting according to new machining conditions in the step S170 and subsequent steps.

When it is determined in the step S220 that the tooth-contact state 60 is the proper tooth-contact state (or when it is within the judgment tolerance of the target value 53, the determination unit 21 determines that the adoption of the created gear model 59 is possible, and it progresses to step S240 following step S220.

In step S240, the gear cutting simulation device 10 determines whether the simulation of heat treatment and lapping is carried out for the gear model 59. When the simulation of heat treatment and lapping is not carried out, it progresses to step S270.

In step S270, the heat-treatment simulation unit 22 of the gear cutting simulation device 10 performs the simulation of heat treatment of the gear model 59, which creates the heat-treatment model 61 (pinion heat-treatment model 61a, gear heat-treatment model 61b) which is the gear model 59 being deformed with the heat treatment, as a result of the simulation of the heat treatment. In addition, the simulation of heat treatment is well known in the art, and a description thereof will be omitted.

Progressing to step S280 following step S270, the lapping simulation unit 23 of the gear cutting simulation device 10 performs the simulation of lapping of the heat-treatment model 61, which creates the lapping model 62 (pinion lapping model 62a, gear lapping model 62b) which is the heat-treatment model 61 being deformed with the lapping, as a result of the simulation of the lapping.

The simulation of the lapping to be performed in the step S280 is the same processing as the steps S170 and S180 of FIG. 4. Namely, the heat-treatment model 61 is arranged on the 3 dimensional model of the lapping machine shown in FIG. 28, and the Boolean logic operation of the pinion heat-treatment model 61a and the gear heat-treatment model 61b is performed.

Figure 28:
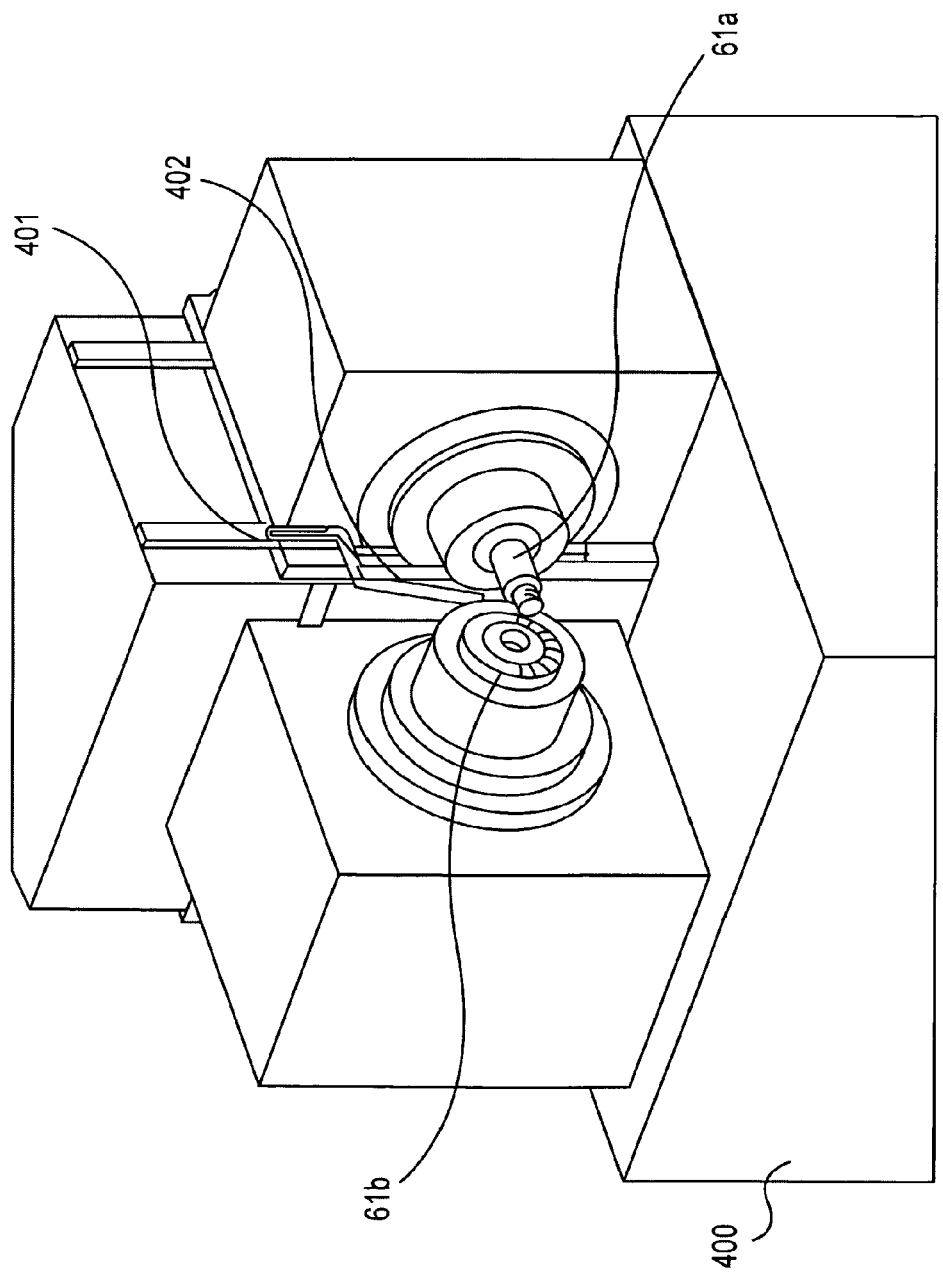
FIG. 28 is a diagram showing an example of the screen indicating the situation of the simulation of lapping.

FIG. 28 shows the situation of the simulation of lapping. In FIG. 28, the pinion heat-treatment model 61a and the gear heat-treatment model 61b are installed in the lapping machine 400 in the engaged state. The lapping simulation unit 23 performs the Boolean logic operation of the pinion heat-treatment model 61a and the gear heat-treatment model 61b while the pinion heat-treatment model 61a and the gear heat-treatment model 61b are rotated from the assembled state and further moved in any of the three directions including the axial direction of the pinion, the axial direction and the offset direction of the gear.

Progressing to step S200 following step S280, the gear cutting simulation device 10 performs again the analysis processing of the tooth-contact state in the step S200 and subsequent steps with the lapping model 62. However, since the analysis of the tooth-contact state needs the consideration of the deformation through the heat treatment and lapping, there is a case in which the determination result in step S220 differs from the determination result before the simulation of heat treatment and lapping is performed.

When the determination unit 21 determines in the step S220 that the tooth-contact state with the lapping model 62 is good and the adoption of the lapping model 62 is possible, it will progress to step S250 through step S240.

In step S250, the gear model machining simulation device 10 outputs the machine setting of the gear cutting machine, the cutter specification, and the gear specification value. The output result includes the same parameters as the outline geometry value 51 of FIG. 9 and FIG. 10, the cutter specification 55 of FIG. 11, and the machine setting 57 of FIG. 12. Therefore, the person in charge of the gear manufacture can produce the pinion and the gear from which the proper tooth-contact state is acquired, if the gear is created according to the above-mentioned output result.

Progressing to step S260 following step S250, in order to check the validity of the simulation result which will be mentioned later, the gear model machining simulation device 10 outputs the 3-dimensional coordinates data of the tooth flank of the lap model 62, so that the processing is finished.

Figure 29:
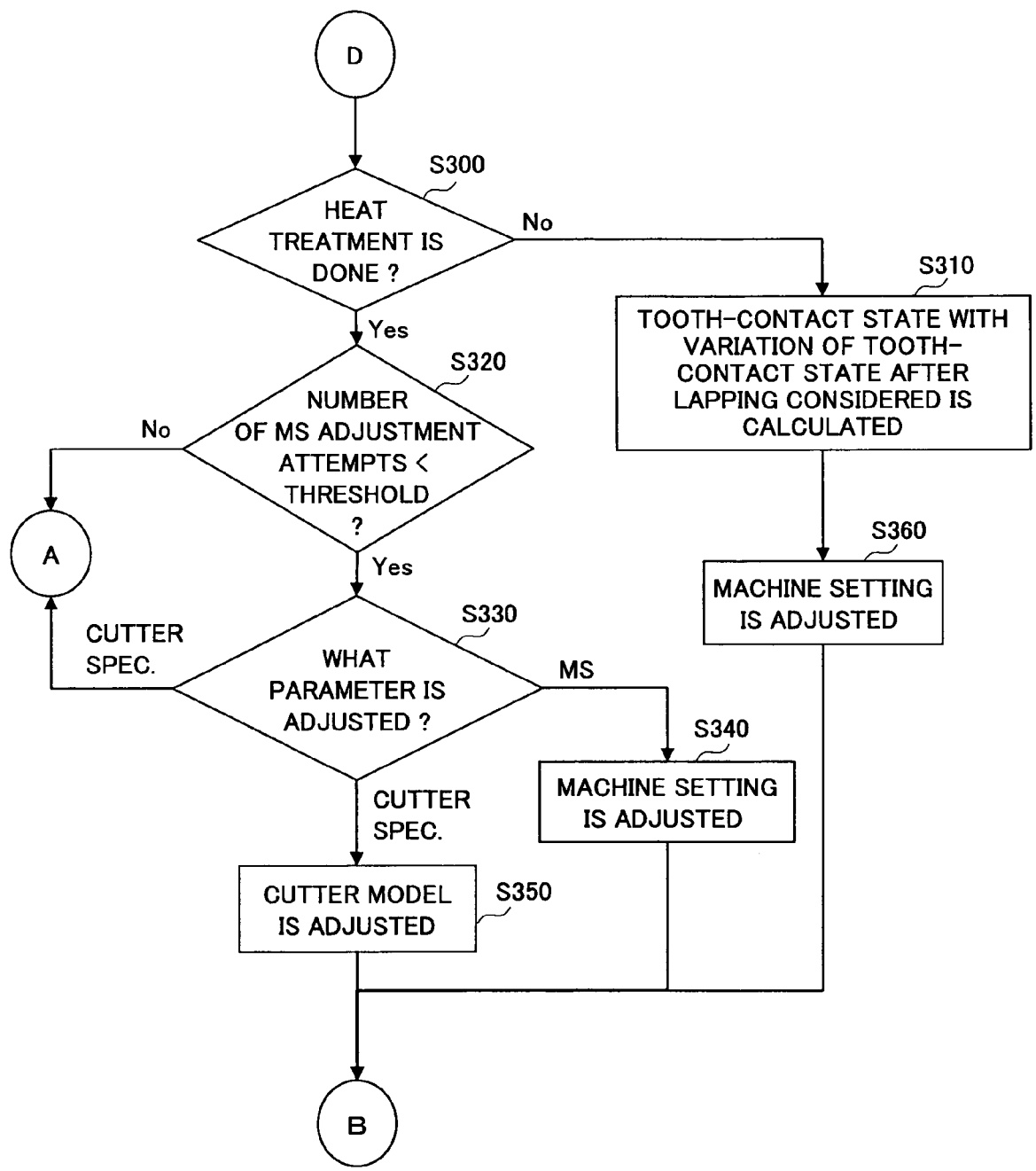
FIG. 29 is a flowchart for explaining the processing of parameter adjustment in the outline gear cutting simulation processing of FIG. 3.

Next, a description will be given of the parameter adjustment processing in the step S40 of FIG. 3. FIG. 29 is a flowchart for explaining the parameter adjustment processing.

When it is determined in the step S220 of FIG. 24 that the adoption of the gear model 59 or the lap model 62 is impossible, it progresses to step S300.

In step S300, the gear cutting simulation device 10 determines whether the simulation of heat treatment and lapping of the gear model 59 is already performed (or whether it is the lapping model 62). When it is determined that the simulation of heat treatment and lapping is not performed, it progresses to step S310.

In step S310, the correction tooth-contact state calculation unit 24 of the gear cutting simulation device 10 calculates how there should be any tooth-contact state (called the correction tooth-contact state) in the gear model 59 before the simulation of heat treatment and lapping by comparing the tooth-contact state 60 with the target value 53, in order for the tooth-contact state by the lapping model 62 to become proper.

In addition, the correction tooth-contact state is outputted with the parameters which are the same as the parameters for the determination of FIG. 6.

Progressing to step S360 following step S310, the correction tooth-contact state calculation unit 24 calculates the machine setting 57 of the gear cutting machine from which the correction tooth-contact state is acquired, and sets the calculation result to the gear-cutting-machine model 58.

When it is determined in the step S300 that the simulation of heat treatment and lapping is already performed, it progresses to step S320 and the gear cutting simulation device 10 determines whether the number of times of change of the machine setting 57 of the gear-cutting-machine model 58 is larger than the predetermined threshold.

This step is performed to avoid the infinite loop formation when the processing in which the machine setting 57 is adjusted and the simulation of the gear cutting and the simulation of the tooth-contact state are performed again is repeated by the flowchart of FIG. 24, and the machine setting 57 is again adjusted if the adoption is determined as being impossible. Therefore, when the number of times of change of the machine setting 57 exceeds the predetermined threshold, it progresses to step S10 of FIG. 4, so that the input processing of the new design value 50 is performed again.

Progressing to step S330 following step S320, the parameter adjustment unit 25 of the gear cutting simulation device 10 determines which of the cutter specification 55 or the machine setting 57 should be adjusted by referring to the adjustment parameter judgment table 30, in order to obtain the proper tooth contact.

FIG. 30 shows the adjustment parameter judgment table. The adjustment parameter judgment table 30 of FIG. 30 is provided to manage the tooth-contact evaluation value for every state of the tooth-contact state 60, and the adjustment value (difference with the present value) of the gear cutting conditions for obtaining the proper tooth contact. Namely, as a kind of tooth-contact state 60, the adjustment parameter judgment table 30 contains various kinds of items in the direction of the column (width), and has in it the item with "the adjustment value of machining conditions" as the "tooth contact" which illustrated the state of the tooth contact with the ellipse form, and "the evaluation value of the tooth-contact state" and the adjustment value of the machining conditions for obtaining the proper tooth contact in the direction of the line (length), the evaluation value of the tooth-contact state" includes the same parameters as the target value 53, and the tooth-contact state 60 which it is as a result of over the target value 53 analysis and it is shown more.

The evaluation value of the tooth-contact state is calculated as the result of division of the tooth-contact state 60 by the target value 53. Therefore, when the "bias angle" which is one of the parameters of "evaluation value of the tooth-contact state" is set to 1, it means that the bias angle of the tooth-contact state 60 is equal to the bias angle of the target value 53. The adjustment value of machining conditions is constituted by the diameter adjustment value of the cutter as the adjustment value of the diameter of the cutter which is the one parameter of the cutter specification 55, and the machine setting adjustment value as the adjustment value of machine setting 57.

The state 1 expresses the case where all the parameters are 1, i.e., the tooth-contact state 60 accords with the target value 53. It means that the proper tooth-contact state is acquired, and this case does not need to adjust the diameter of the cutter and the machine setting 57.

The state 2 expresses the case where the evaluation value of the ratio of the tooth-contact area to the area of the tooth flank is larger than 1.5, i.e., the value in the tooth-contact state 60 is larger than 1.5 times of the value in the target value 53. In this case, the adjustment parameter judgment table 30 shows that there is the need for the adjustment of the machine setting 57, although there is no need for the adjustment of the diameter of the cutter. In FIG. 30, "***" indicates the adjustment value.

Similar to the state 2, the state 3 expresses the case where there is the need for the adjustment of the machine setting 57, although there is no need for the adjustment of the diameter of the cutter.

The state 4 expresses the case where the evaluation value of the ratio of the tooth-contact length in the tooth trace direction to effective tooth trace length is 1.5. In this case, although there is no need for the adjustment of the machine setting 57 as in the adjustment parameter judgment table 30, it is necessary to change the diameter of the cutter.

In addition, what is necessary is just to create the adjustment value of the machining conditions for every state by accumulating the past data. Therefore, although only the four kinds are illustrated for convenience about the kind of state, if it has dozens of kinds of data in fact and data increase in number, the kind of state will also increase, and the accuracy of the adjustment of the diameter of the cutter and machine setting 57 can be raised, so that there are many kinds of state.

In step S330 of FIG. 29, when the parameter adjustment unit 25 determines that the adjustment parameter is the diameter of the cutter contained in the design value 50, the processing progresses as follows.

When only the ratio of the tooth-contact length in the tooth trace direction to effective tooth trace length, among the tooth-contact state evaluation values of the adjustment parameter judgment table 30 is not equal to 1, it progresses to step S350. In step S350, the parameter adjustment unit 25 adjusts the diameter of the cutter, and creates the new cutter model 56.

When the ratio of the tooth-contact length in the tooth trace direction to effective tooth trace length among the tooth-contact state evaluation value is equal to 1, or when any of the parameters other than the ratio of the tooth-contact length in the tooth trace direction to effective tooth trace length is not equal to 1, it progresses to step S110 of FIG. 4. And the processing after the step S110 is performed based on the adjustment value of the diameter of the cutter acquired from the table 30.

Moreover, when the parameter adjustment unit 25 determines in the step S330 that the adjustment parameter is the machine setting 57, it progresses to step S340. In step S340, the parameter adjustment unit 25 sets the adjustment value of the machine setting 57 acquired from the adjustment parameter judgment table 30 to the gear-cutting-machine model 58.

When the gear cutting simulation device 10 adjusts in step S340, step S350 or step S360 the cutter model 56 or the gear-cutting-machine model 58, it will progress to step S170 of FIG. 4. And the processing after the step S170, i.e., the analysis of the tooth-contact state, the simulation of the gear cutting, etc. will be performed again.

As mentioned above, the simulation of the gear cutting which is the procedure equivalent to the machining of the actual gear is performed in the present embodiment, and the gear model 59 which has the same configuration as that of the actual gear can be obtained. Moreover, the tooth-contact state is analyzed using the gear model 59 which has the same configuration as that the actual gear, and the tooth-contact state equivalent to the actual tooth-contact state can be acquired. Furthermore, the simulation of the correction of machining conditions and gear cutting is repeated until the proper tooth contact is obtained if the tooth-contact state is not good, and the gear geometry value, the machining conditions, etc. for obtaining the proper tooth contact, can be acquired easily.

Next, a description will be given of the method of checking the validity of the gear geometry value and the machining conditions acquired from the gear cutting simulation device 10.

Figure 31:
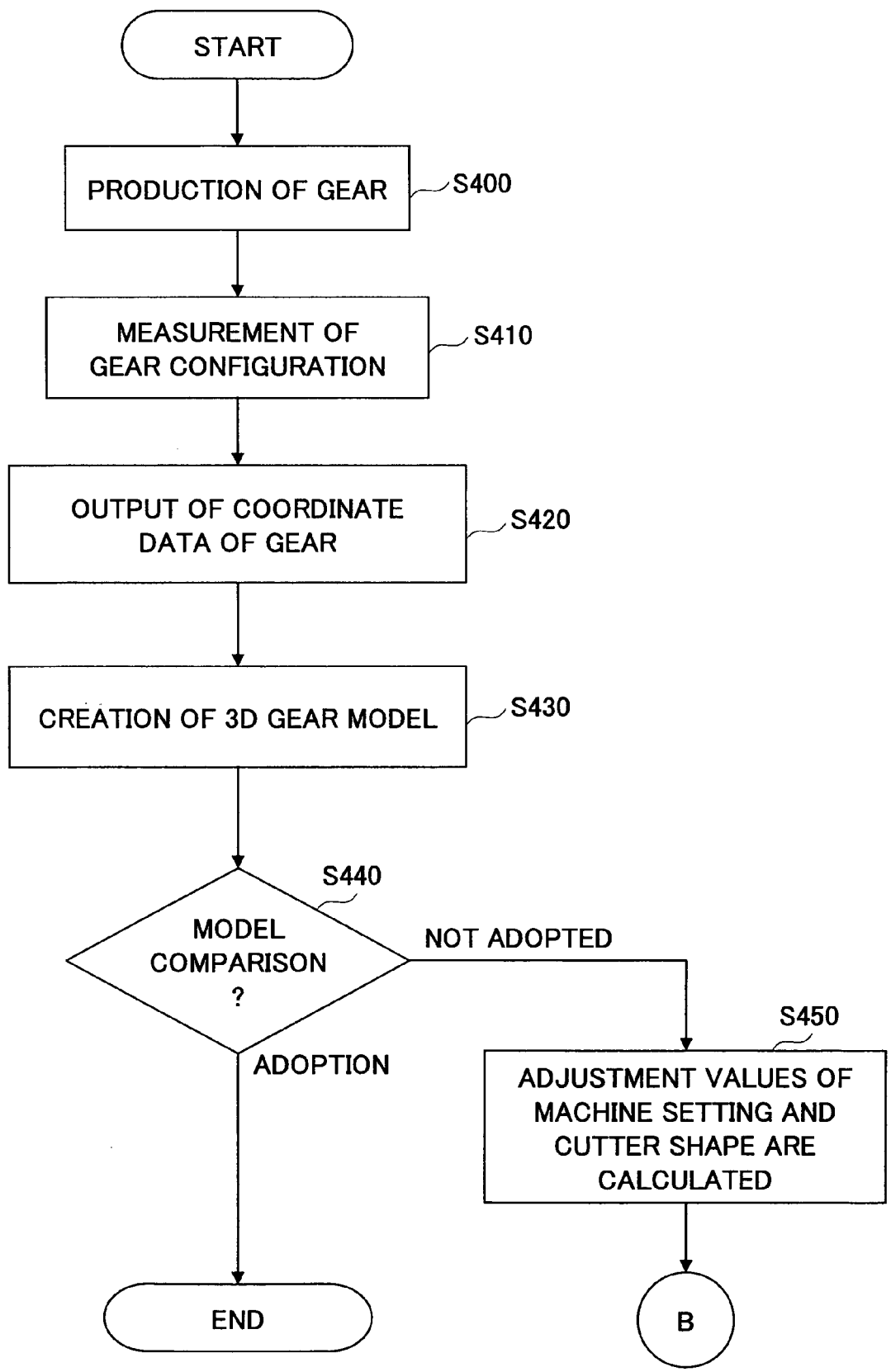
FIG. 31 is a flowchart for explaining the method of checking the validity of the simulation result.

FIG. 31 is a flowchart for explaining the method of checking the validity of the simulation result.

In step S400, the actual gear is produced based on the gear-geometry value, the machining conditions, etc. which are acquired from the gear cutting simulation device 10.

Progressing to step S410 following step S400, the geometric configuration of the produced gear is measured with the three dimensional measuring instrument or the configuration measurement machine.

Progressing to step S420 following step S410, the coordinate data of the gear configuration measured by the three dimensional measuring instrument etc. are outputted.

Progressing to step S430 following step S420, the gear 3 dimensional model (called the gear real model) is created based on the coordinates data of the gear configuration. What is necessary is just to create the gear real model according to the same data format as the gear model 59.

Progressing to step S440 following step S430, the configuration of the gear model 59 and the gear real model is compared. The validity of the simulation result is affirmed when the comparison result is the same configuration or the difference is within the tolerance. When the difference of the configuration is significantly large, it progresses to step S450.

In step S450, the machine setting 57 and the cutter specification 55 for adjusting the tooth configuration are calculated, and the gear-cutting-machine model 58 and the cutter model 56 are adjusted accordingly. Furthermore, what is necessary is just to perform the processing after step S170 of FIG. 4 based on the adjusted gear-cutting-machine model 58 and the adjusted cutter model 56.

The present invention is not limited to the above-described embodiments, and variations and modifications may be made without departing from the scope of the present invention.

What is claimed is:

1. A gear cutting simulation method comprising the steps of:
   creating, in a gear cutting simulation device, a gear-cutting-machine model which specifies relative positions between a blank model and a cutter model;
   creating a gear model as a result of simulation of gear cutting performed with the blank model and the cutter model arranged in the gear-cutting-machine model;
   outputting data indicating a tooth-contact state as a result of tooth-contact simulation performed by changing the relative positions between portions of the gear model which are arranged in an assembled state with one another;
   and comparing the outputted data indicating the tooth-contact state with a predetermined reference value, so that validity of the gear model is determined by the comparison result.

2. The gear cutting simulation method according to claim 1 wherein the step of creating the gear model comprises performing a Boolean logic operation of the blank model and the cutter model.

3. The gear cutting simulation method according to claim 1 further comprising the step of adjusting, when a result of the determination negates the validity of the gear model, at least one of the cutter model and a machine setting of the gear-cutting-machine model specifying the relative positions between the blank model and the cutter model, so that the gear model creating step is performed again based on the adjusted cutter model or the adjusted machine setting.

4. The gear cutting simulation method according to claim 1 further comprising the step of creating a gear heat-treatment model as a result of simulation of heat treatment of the gear model which is performed when a result of the determination affirms the validity of the gear model.

5. The gear cutting simulation method according to claim 1 further comprising the step of creating a gear surface-treatment model as a result of simulation of surface treatment of the gear model which is performed when a result of the determination affirms the validity of the gear model.

6. A computer program product, embodied on a computer readable medium, for causing a computer to execute a gear cutting simulation method, the method comprising the steps of:
   creating a gear-cutting-machine model which specifies relative positions between a blank model and a cutter model;
   creating a gear model as a result of simulation of gear cutting performed with the blank model and the cutter model arranged in the gear-cutting-machine model;
   outputting data indicating a tooth-contact state as a result of tooth-contact simulation performed by changing the relative positions between portions of the gear model which are arranged in an assembled state with one another; and
   comparing the outputted data indicating the tooth-contact state with a predetermined reference value, so that validity of the gear model is determined by the comparison result.

7. The computer program product according to claim 6 wherein the method further comprises the step of adjusting, when a result of the determination negates the validity of the gear model, at least one of the cutter model and a machine setting of the gear-cutting-machine model specifying the relative positions between the blank model and the cutter model, so that the gear model creating step is performed again based on the adjusted cutter model or the adjusted machine setting.

8. A gear cutting simulation device which causes a computer to execute a gear cutting simulation method, comprising:
   a machine setting calculation unit configured to create a gear-cutting-machine model which specifies relative positions between a blank model and a cutter model;
   a gear cutting simulation unit configured to create a gear model as a result of simulation of gear cutting performed with the blank model and the cutter model arranged in the gear-cutting-machine model;
   a tooth-contact simulation unit configured to output data indicating a tooth-contact state as a result of tooth-contact simulation performed by changing the relative positions between portions of the gear model which are arranged in an assembled state with one another; and
   a determination unit configured to compare the outputted data indicating the tooth-contact state with a predetermined reference value, so that validity of the gear model is determined by the comparison result.

* * * * *